United States Patent [19]

Jones

[11] Patent Number: 4,783,027

[45] Date of Patent: Nov. 8, 1988

[54] PARACHUTE RELEASE APPARATUS

[76] Inventor: Leon Jones, 16331 Rhone La., Huntington Beach, Calif. 92648

[21] Appl. No.: 96,679

[22] Filed: Sep. 14, 1987

Related U.S. Application Data

[63] Continuation of Ser. No. 770,401, Aug. 28, 1985, abandoned.

[51] Int. Cl.⁴ .............................................. B64D 17/56
[52] U.S. Cl. .................................. 244/149; 244/151 B
[58] Field of Search ............... 244/142, 151 R, 151 A, 244/151 B, 152, 147, 149, 150; 73/386, 387

[56] References Cited

U.S. PATENT DOCUMENTS

| | | | |
|---|---|---|---|
| 1,800,575 | 6/1929 | Tufflemire | 244/150 |
| 1,944,795 | 5/1931 | LaFayette | 244/21 |
| 2,353,440 | 1/1942 | Bresee | 244/150 |
| 2,505,869 | 1/1946 | Quilter | 244/150 |
| 2,584,164 | 2/1952 | Stallan | 244/150 |
| 2,676,655 | 4/1954 | Hatfield | 161/1 |
| 2,697,147 | 12/1954 | Harland | 73/386 |
| 2,960,297 | 11/1960 | Cotter et al. | 244/150 |
| 3,468,502 | 9/1969 | Kinney | 244/150 |
| 3,690,605 | 9/1972 | Jones | 244/149 |
| 3,787,011 | 1/1974 | Phillips et al. | 244/150 |
| 3,813,066 | 5/1974 | Raznov | 244/150 |
| 4,279,392 | 7/1981 | Saxton | 244/150 |

FOREIGN PATENT DOCUMENTS

| | | | |
|---|---|---|---|
| 278695 | 4/1928 | United Kingdom . | |
| 609000 | 9/1948 | United Kingdom | 4/62 |

Primary Examiner—Galen Barefoot
Attorney, Agent, or Firm—Richard L. Gausewitz

[57] ABSTRACT

A parachute release apparatus having a spring powered release mechanism for coupling to the ripcord of the parachute, with a latch retaining a spring powered piston of the release mechanism against the force of the spring. A spring powered timing mechanism is locked out above a preestablished altitude by an aneroid assembly, but operative thereafter. A manually settable interlock coacts with a catch arm to set the spring of the timing mechanism upon winding, with an arming cable assembly actuating the interlock to a release position upon separation of the parachute wearing aviator from the seat or the aircraft. The timing mechanism includes a timing disc viewable through a window only when the release mechanism has been set and when the timing mechanism has been wound.

40 Claims, 12 Drawing Sheets

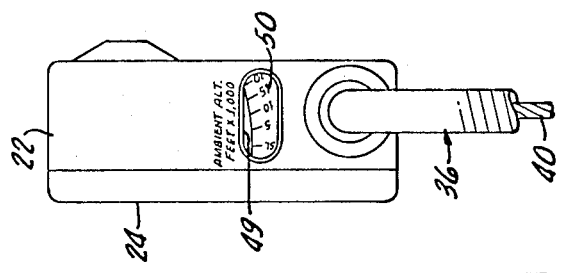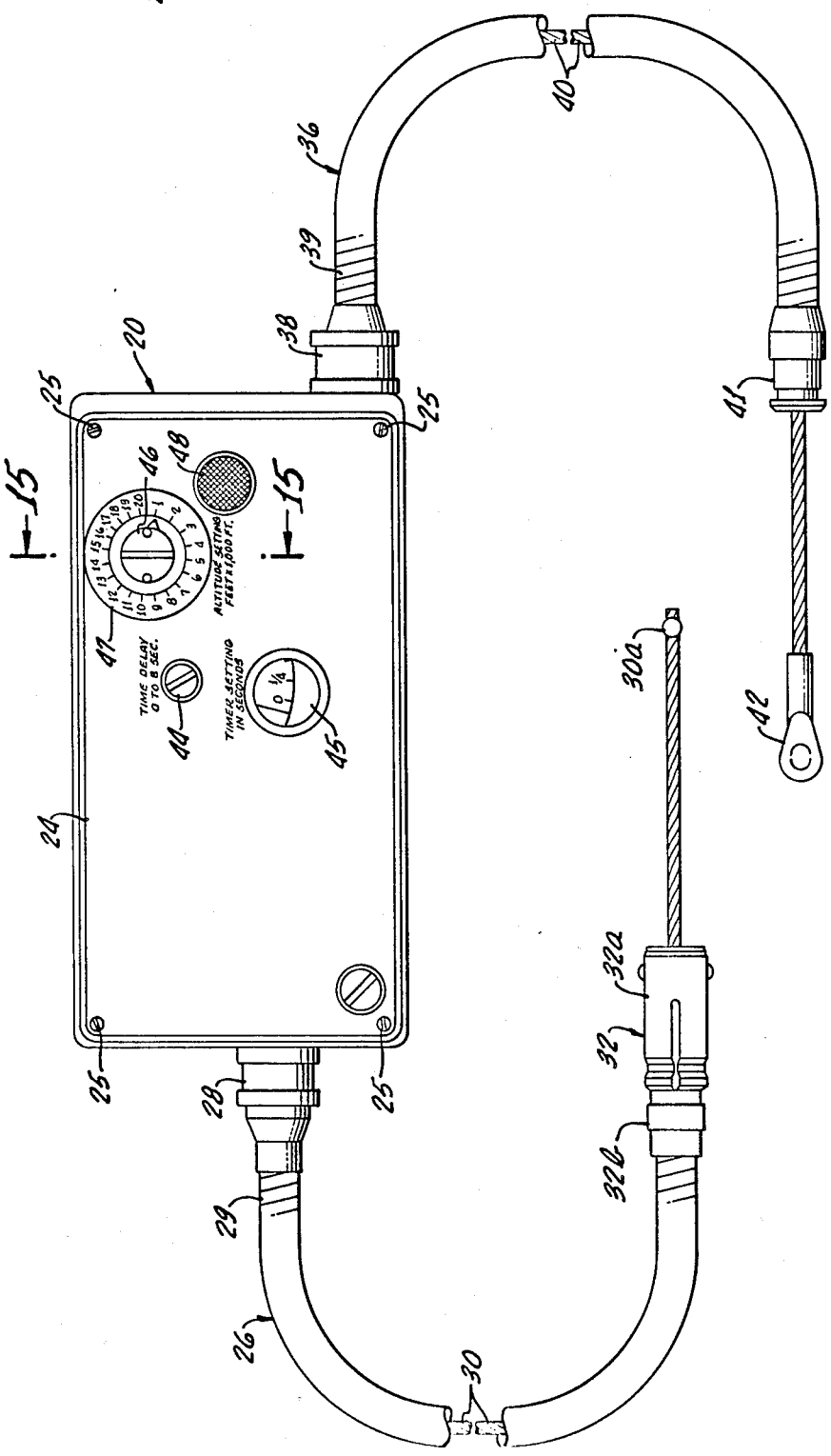

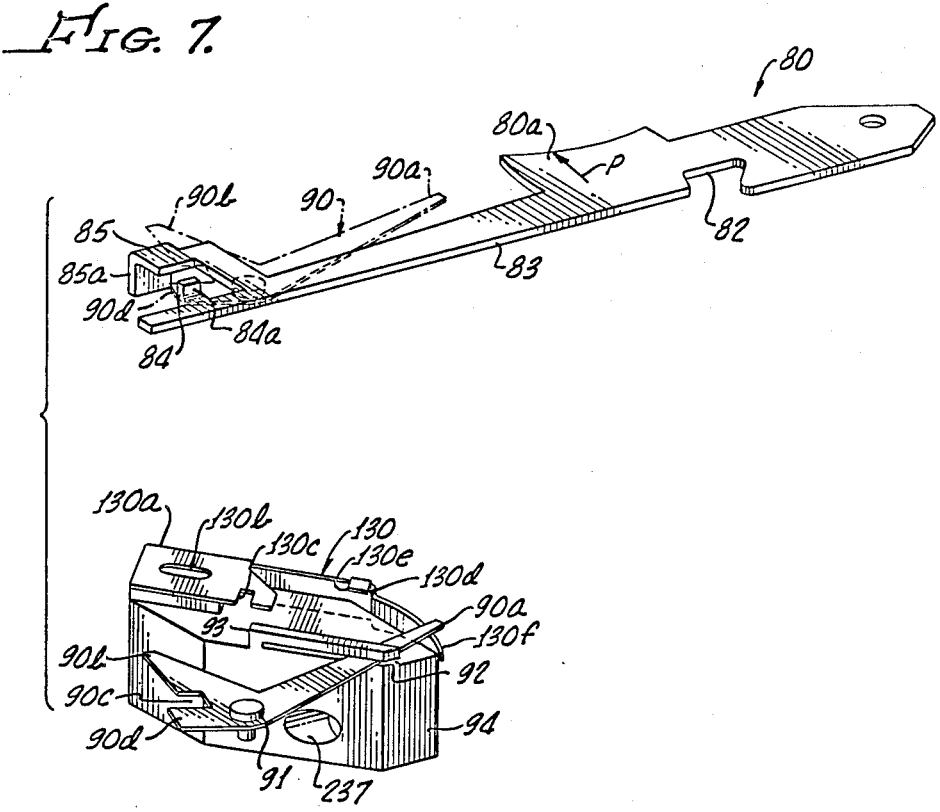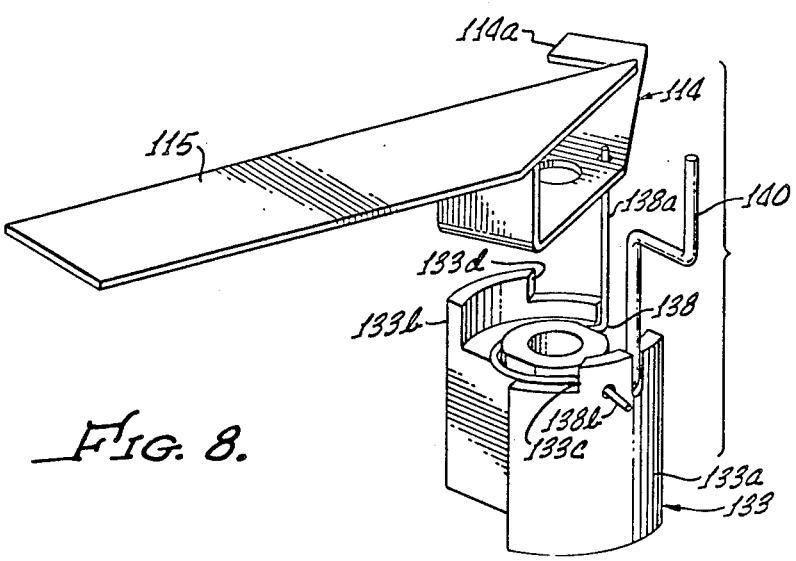

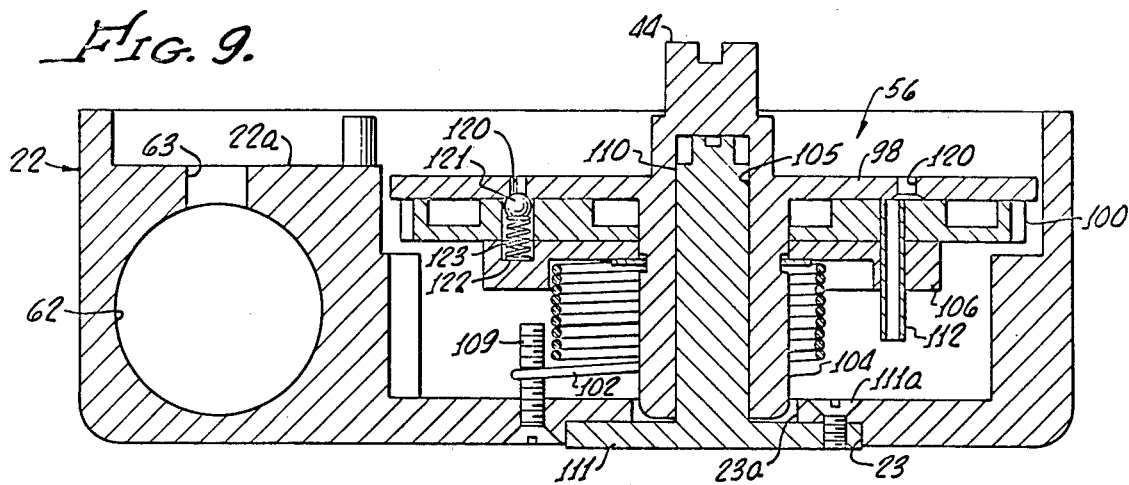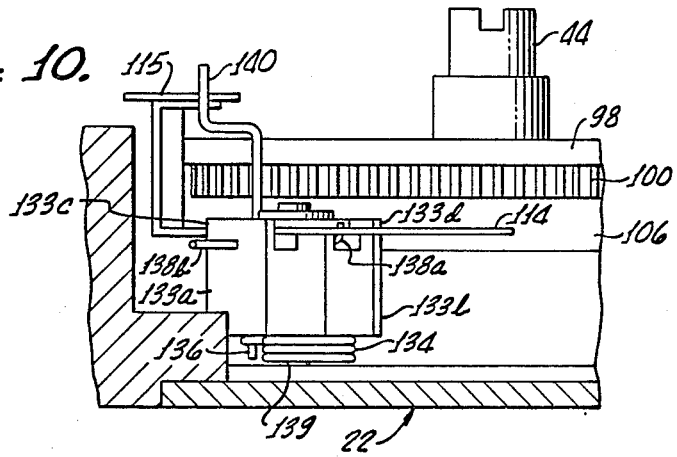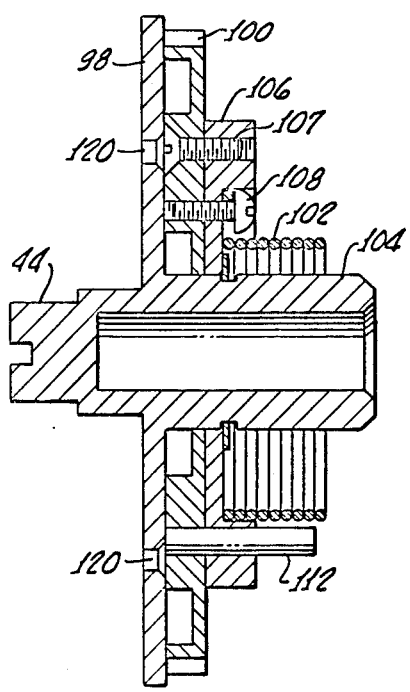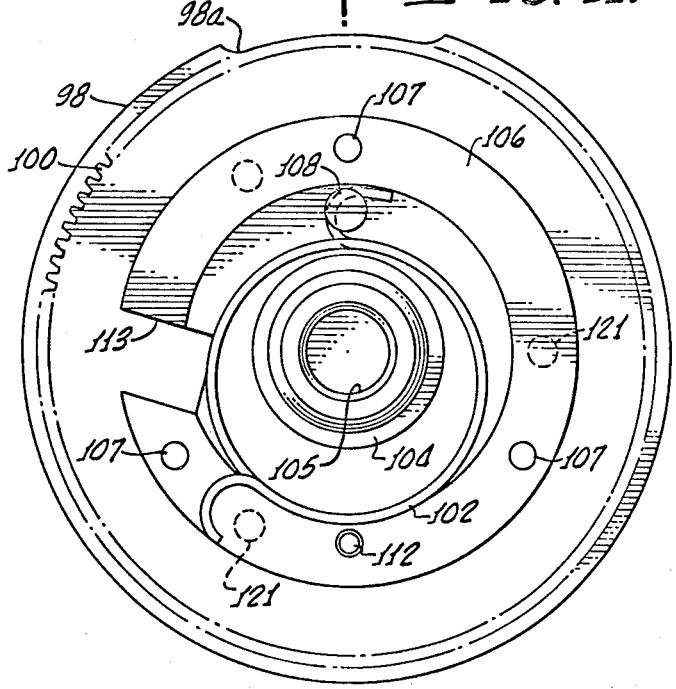

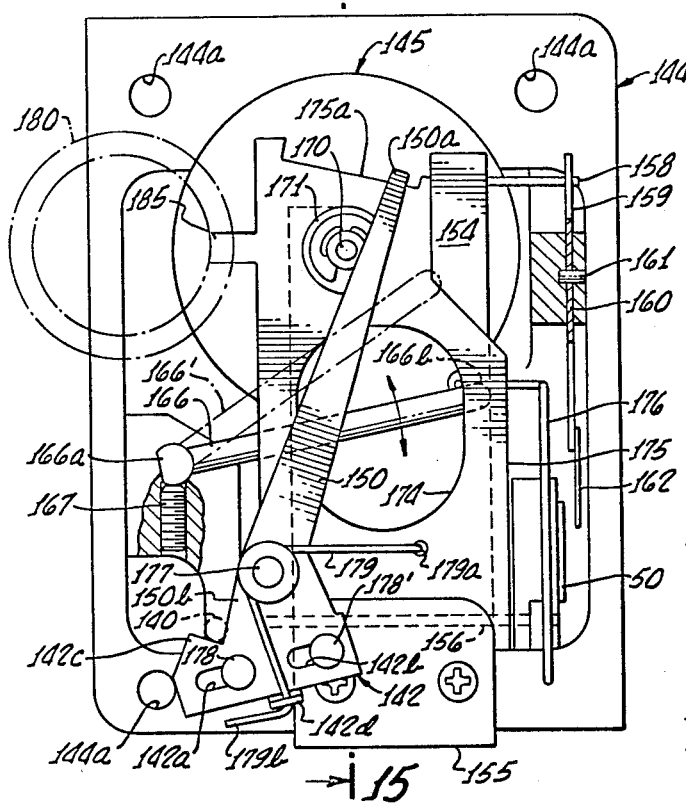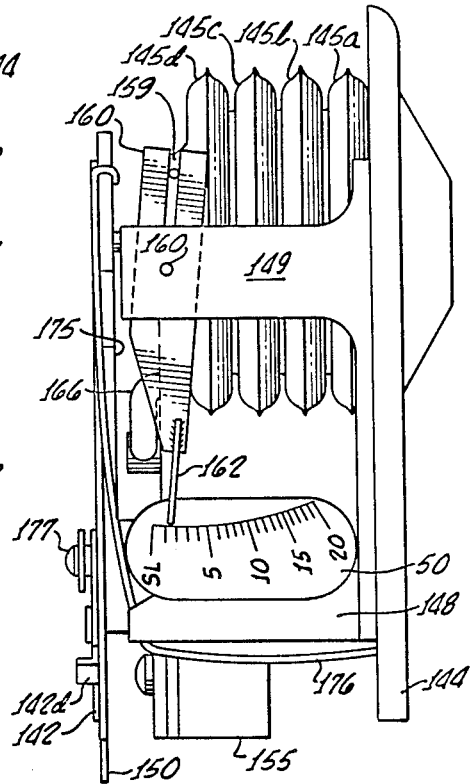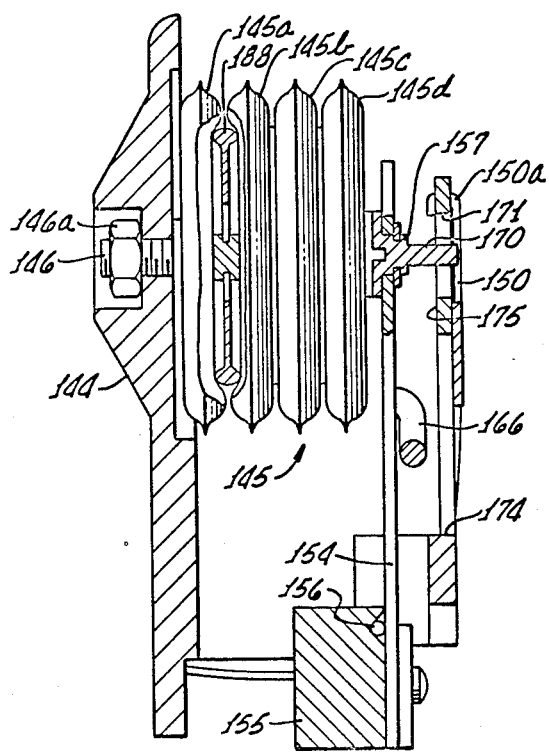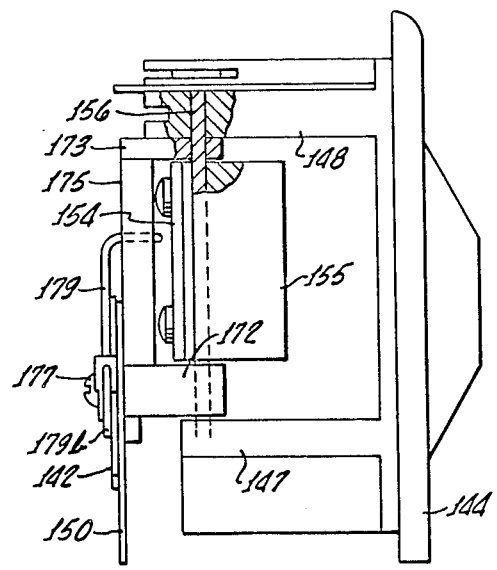

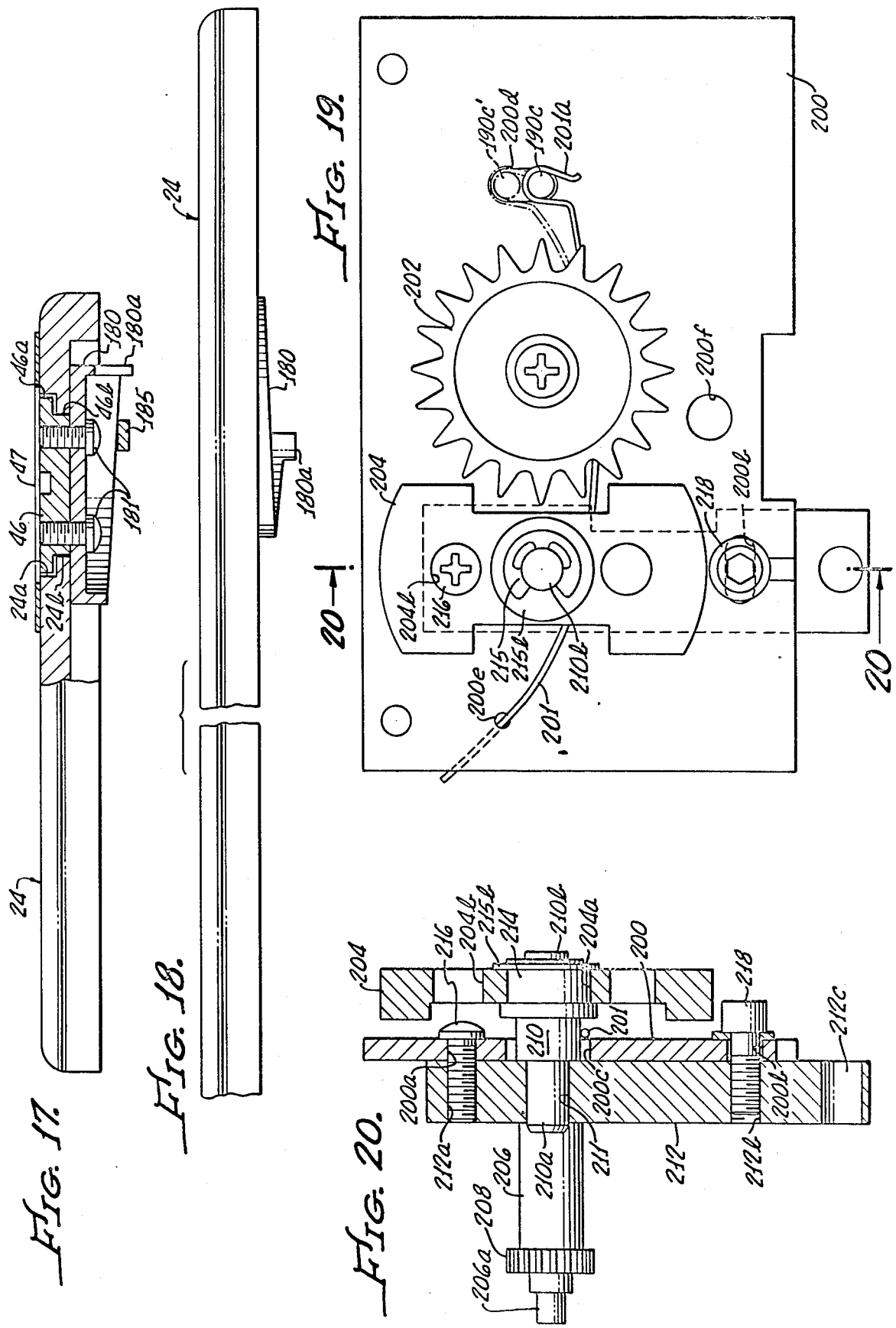

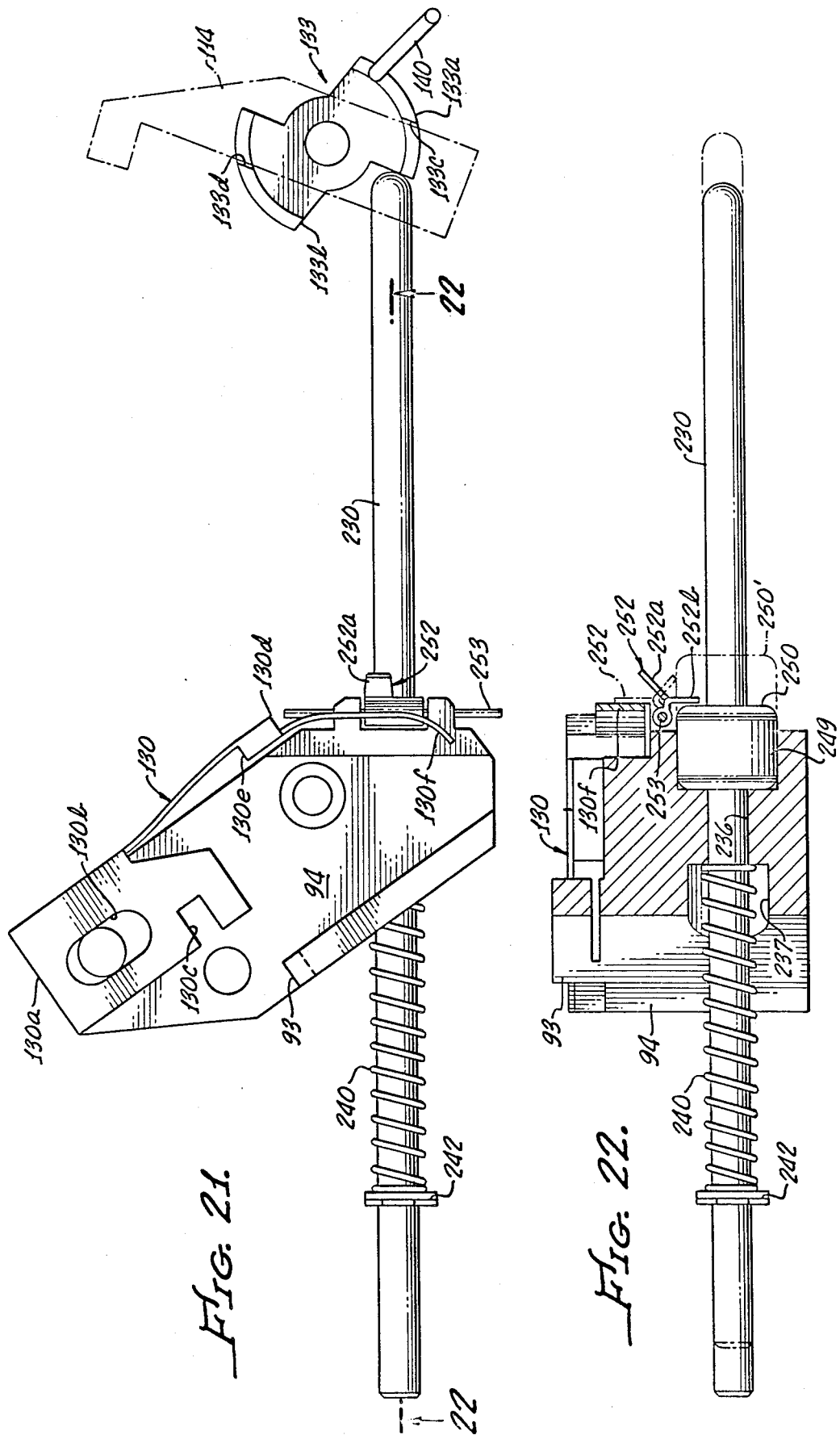

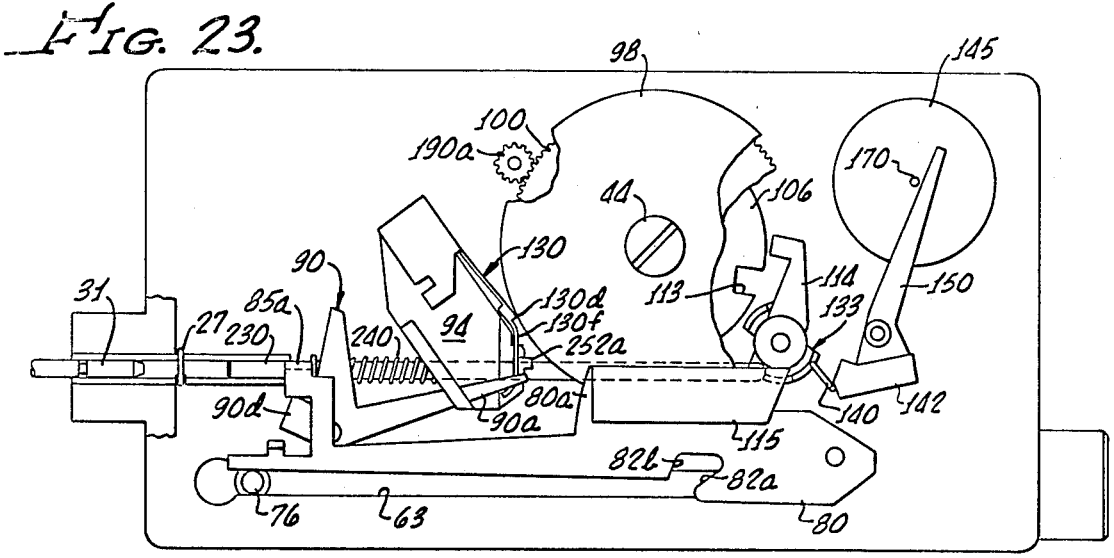
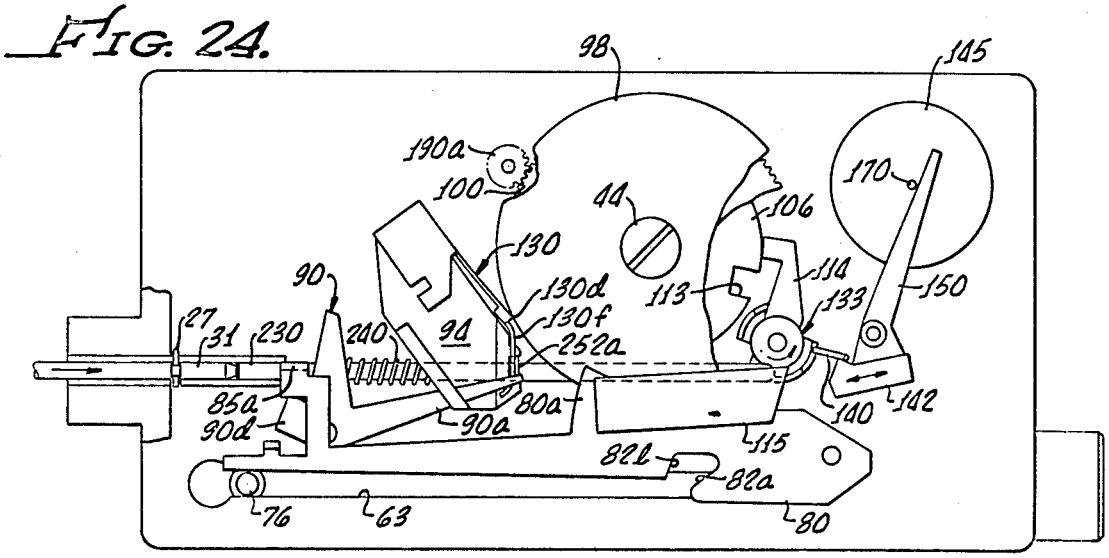
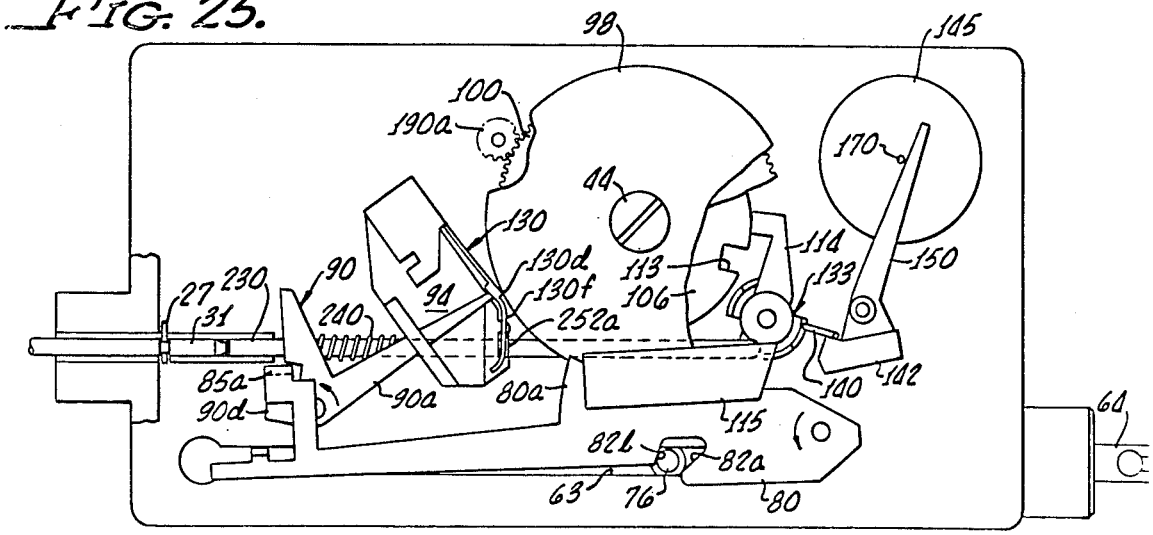

PARACHUTE RELEASE APPARATUS

This is a continuation of application Ser. No. 770,401, filed 8-28-85, for PARACHUTE RELEASE APPARATUS, now abandoned.

FIELD OF THE INVENTION

This invention relates to the field of parachute release apparatus, and more particularly to such apparatus automatically operable below a preset altitude after a preset time interval.

In the context of high speed, high altitude jet aircraft, prior-art devices have encountered a number of problems, particularly problems related to high "G" forces applied in all directions on such devices affecting the mechanisms and parts therein. In such apparatus, forces of twenty to thirty "G's" are not uncommon with sudden shocks approaching in excess of one hundred "G's" being experienced under certain circumstances. Such parachute release apparatus must be able to withstand these forces and still operate reliably.

In prior-art devices having barometric as well as timing mechanisms establishing conditions to release, accurate release altitudes, as well as accurate and repeatable timing intervals have been elusive. This is particularly critical either when the aircraft is on the runway and ejection is required, and/or in instances of a two place jet craft, in which both the pilot and co-pilot must eject virtually simultaneously, but parachute opening of one relative to the other must be delayed by a brief interval. In a two aviator aircraft, during ejection, there is a requirement that the rear aviator should deploy his chute before the front aviator so that they do not collide, but as close to the same time as the front aviator, so that at ground level they both have the maximum amount of time for chute deployment prior to hitting the ground. Time intervals of one-quarter second have been desirable, but unattainable with the prior art. This timing precision must also be available during ejection when subjected to 10 to 30 "G" forces. Such forces tend to bend, twist and otherwise distort components within the apparatus, or disturb the relation between components, even to the extent of locking of the escapement mechanism associated with the timing mechanism.

In addition to accurate repeatable timing within a fraction of a second, and failsafe barometric device actuation, a further requirement for such parachute release mechanism is reuseability, as many as 350 times, without degradation of performance. In certain prior art devices, the power spring of the ripcord release mechanism has been employed as the driving force for the timing mechanism. In such devices, the timing interval varies in an unpredictable nonlinear manner. In other such devices, complex gear mechanisms are employed for coupling to the timing mechanism with repeatability of time intervals being difficult to obtain as a result of the amount of lash in the gears. As a general rule, the more gears, the more lash between input and output, and the less the accuracy.

The tremendous force required for the ripcord operating spring has provided an additional source of problems in that gear teeth, linkages or levers may be broken or bent during the sudden release of energy needed to operate the cord. Where aneroid devices are employed, sudden high shock forces may create distortions or imbalances affecting performance of the apparatus.

It is an object of the present invention to provide a new and improved automatic parachute release apparatus.

It is another object of the present invention to provide a new and improved automatic parachute release apparatus with provision for effecting accurate repeatable timing to within one-quarter of a second.

It is a further object of the present invention to provide a new and improved parachute release apparatus which may be subjected to high gravitational forces and shock without significant loss of accuracy.

It is still another object of the present invention to provide a new and improved parachute release apparatus having internal provision for adjustment to eliminate component tolerance differences.

It is yet another object of the present invention to provide a new and improved parachute release apparatus having means for visually ascertaining proper presetting of parts and for externally adjusting the release altitude and release time interval.

It is a still further object of the present invention to provide a new and improved automatic parachute release apparatus having an interlock mechanism coacting with the timing mechanism and actuating mechanism.

SUMMARY OF THE INVENTION

The foregoing and other objects are accomplished by providing a parachute release apparatus having a spring powered release mechanism adapted for coupling to the ripcord of the parachute and operable between a first position and a second position, with a first latch coacting with the release mechanism for retaining a spring powered piston in a first position against the force of the spring. A spring powered timing mechanism, operates in conjunction with an overriding adjustable ambient atmospheric sensing device which has a trigger operatively interconnected thereto, but disabled above a preestablished altitude. The spring of the timing mechanism may be wound with energy stored in the spring by a catch arm only when an interlock is manually set to a lock position against the force of its spring, with an arming cable assembly actuating the interlock to a release position upon separation of the parachute wearing aviator from the seat or the aircraft. The catch arm is operatively interconnected to the trigger to prevent operation of the timing mechanism until the preestablished altitude has been reached. The timing mechanism includes a timing disc having a cam portion which may be manually angularly adjusted relative to a timing gear to preselect a predetermined time interval. The cam portion coacts with a cam follower which is disabled when the interlock is in the lock position and enabled when the interlock is in the release position, the cam follower coacting with a second latch which releasably engages the first latch on contact with the cam portion of the timing disc to actuate the release mechanism to its second position and thereby actuate the parachute.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 1 is a front view of the parachute release apparatus in accordance with the present invention;

FIG. 2 is an end elevational view of the parachute release apparatus of FIG. 1;

FIG. 7 is an exploded perspective view illustrating the latch members and cam follower arm of the apparatus of FIG. 3;

FIG. 8 is an exploded perspective view of the catch member and pivot block assembly of the apparatus of FIG. 3;

FIG. 9 is a cross-sectional view of the apparatus of FIG. 4, taken along line 9—9 thereof, showing details of the spring-powered timing mechanism;

FIG. 10 is a cross-sectional view of the apparatus of FIG. 4, taken along line 10—10 thereof, showing details of the catch mechanism;

FIG. 11 is a front elevational view, partially in cross-section, of the spring-powered timing mechanism of the apparatus of FIG. 3;

FIG. 12 is a cross-sectional view of the timing mechanism of FIG. 11 as viewed generally along line 12—12 thereof;

FIG. 13 is a front plan view of the aneroid capsule module of the apparatus of FIG. 3, partially in cross-section;

FIG. 14 is a right side elevational view of the aneroid capsule module of FIG. 13;

FIG. 15 is a cross-sectional view of the aneroid capsule module of FIG. 13 as viewed generally along line 15—15 thereof;

FIG. 16 is a bottom view, partially broken away and partially in cross-section, of the aneroid capsule module of 13;

FIG. 17 is an end view, partially broken away and partially in cross-section, of the cover of the apparatus of FIG. 1;

FIG. 18 is a bottom edge view, partially broken away, of the cover of the apparatus of FIG. 1;

FIG. 19 is a front elevational view of the escapement mechanism of the apparatus of FIG. 3;

FIG. 20 is a cross-sectional view of the escapement mechanism of FIG. 19 as viewed generally along line 20—20 thereof;

FIG. 21 is a front elevational view of the interlock mechanism assembly of the apparatus of FIG. 3;

FIG. 22 is a cross-sectional view of the assembly of FIG. 21 as viewed generally along line 22—22 thereof;

FIG. 23 is a front view of the apparatus showing the major operative components in the fired or released condition;

FIG. 24 is a front view of the apparatus showing the major operative components in the respective positions after the interlock assembly has been set;

FIG. 25 is a front view of the apparatus showing the major operative components in the respective positions after setting the ripcord release mechanism;

DESCRIPTION OF THE PREFERRED EMBODIMENT

Figure 3:
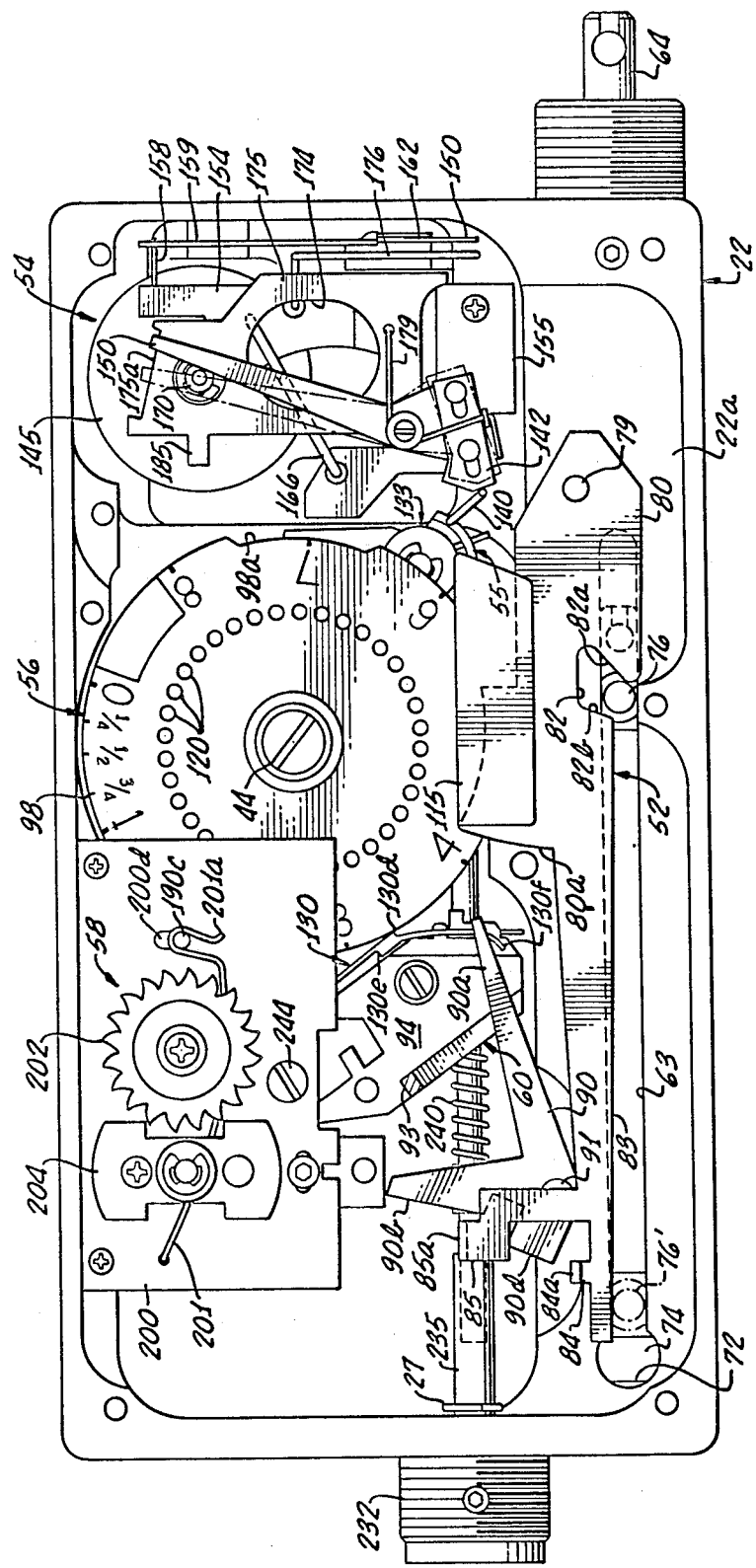
FIG. 3 is a front view of the parachute release apparatus of FIG. 1 with the top cover thereof removed.

Referring now to the drawings, and particularly to FIGS. 1 and 2, there is shown a parachute release apparatus 20 according to the invention, the apparatus 20 being encased in a generally rectangular boxlike housing having a bottom housing 22 and a cover 24 suitably secured thereto such as by a plurality of screws 25 positioned about the periphery of the cover 24 and passing therethrough into threadable engagement with the sidewalls of the bottom housing 22. The housing 22 is formed of a metal block, such as aluminum, having the interior thereof suitably machined, tapped and threaded for securing the parts therein and thereto. Secured to the left end of the housing 22 is an arming cable assembly, generally designated 26, which is essentially a Bowden type cable assembly having a connector 28 threadably attached to the housing 22, with a flexible sheath 29 having a cable 30 passing therethrough to a separable cable connector 32 at the other end thereof.

Similarly, a parachute ripcord release cable assembly, generally designated 36, is secured to the other end of the housing 22 by a Bowden type cable assembly with a connector 38 fixedly secured to the housing 22, with a flexible sheath 39 having a cable 40 passing therethrough with a coupler 41 at the end thereof, the cable 40 terminating in an eyed ripcord attachment member 42 adapted for attachment to the ripcord (not shown).

In a conventional manner, the apparatus 20 is attached to the parachute harness in fixed relation therewith, and the arming assembly 26 has the separable connector 32 thereof secured to a fixed portion of the aircraft or seat so that upon separation of the parachute-equipped pilot from the aircraft or seat, the cable 30 of the arming assembly 26 becomes withdrawn from the release apparatus 20 traveling with the pilot.

The cover 24 of the apparatus 20 has an opening to expose a timing adjustment slot 44, a release timing adjustment viewing window 45 and a release altitude adjustment screw 46 surrounded by a washer-shaped altitude indicator dial 47. A mesh-screen or sintered metal filter covers aperture 48 to permit sensing of ambient atmospheric pressure within the chamber of the housing 20. The side of housing 22 has a second window 49 which enables viewing of the indicator 50 showing the present or ambient altitude of the apparatus therethrough.

As will be hereinafter described, provision is made internally for blocking viewing of the timing numbers normally visible through the viewing window 45 in the event either the timing mechanism has not been wound, or the spring for the parachute release cable assembly 36 is not set properly, thus providing visual indications for pilot attention prior to entering the aircraft. Additionally, the visual indication of ambient altitude viewable through window 49 may be checked to provide an indication of aneroid leakage when the indication thereof is compared with a known altitude at the airfield.

Brief General Description

Figure 4:
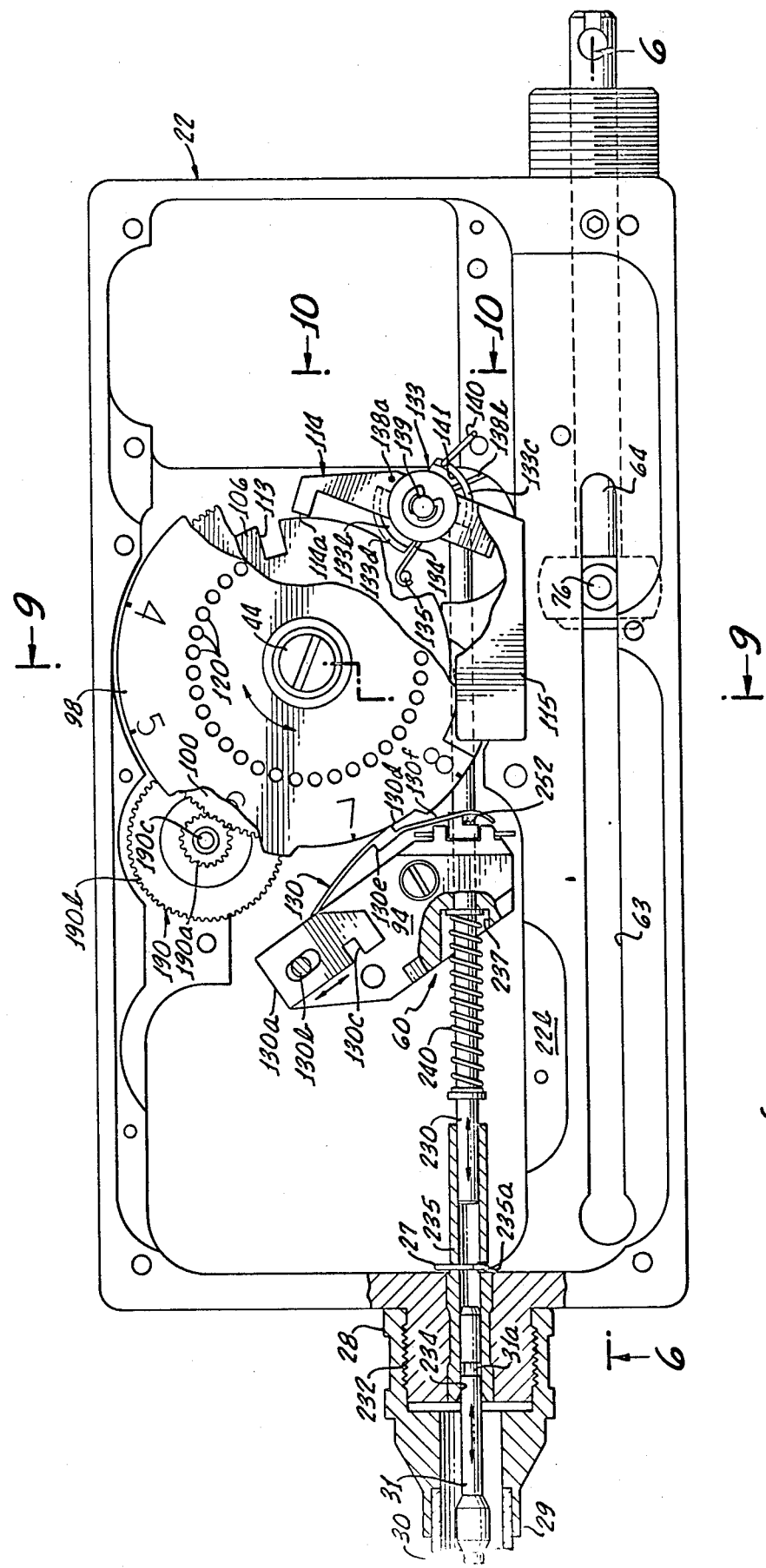
FIG. 4 is a front view similar to FIG. 3 with the aneroid mechanism removed, and with parts partially broken away to illustrate interior details.

Referring now to FIGS. 3 and 4, the cover 24 has been removed to illustrate the interior mechanism, with FIG. 3 depicting the mechanism essentially in its entirety. Within the housing 22 of the apparatus there are main functional groupings of components, the first being the power spring actuated ripcord release assembly generally designated 52 which is physically located across the bottom of the housing 22 as viewed in FIG. 3, and shown more fully in FIG. 6. An ambient barometric sensing means in the form of an aneroid capsule module, generally designated 54 (shown more fully in FIGS. 13–16) is located at the upper right corner within housing 22, with the spring powered timing mechanism, generally designated 56 located generally centrally within the housing 22 (shown more fully in FIGS. 9–12). An escapement mechanism, generally designated 58 is adjacent to, and to the left of the timing mechanism 56 (shown more fully in FIGS. 19 and 20). Although the escapement mechanism 58 is, in fact, a part of the timing mechanism 56, for assembly purposes, it is a separate subassembly, and will be described as such for purposes of clarity of description. Interconnecting the arming cable assembly 26 with the mechanism is an arming mechanism interlock assembly, generally designated 60 (shown more fully in FIGS. 21 and 22). A catch assembly (depicted in FIGS. 3 through 5, 8 and 10), generally designated 55, interconnects the timing mechanism 56 and the aneroid capsule module 54 under control of the interlock assembly 60.

Briefly, and without regard to specifics at this piont, the spring powered ripcord release assembly 52 is held in a cocked position by a first latch, which coacts with a second latch that is part of the interlock assembly 60. Assembly 60 interacts with a cam follower means, the timing mechanism 56 and the aneroid assembly 54. The interlock assembly 60 is set when the arming mechanism is set. Means are provided in the timing mechanism 56 for selecting a timing interval from zero to eight seconds in one-quarter of a second increments viewable through the window 45, the setting of this time interval requiring presetting of the angular position of a cam timing disc which coacts with the cam follower means. Rotational energy can be stored in the spring of the timing mechanism 56 only when the interlock assembly 60 is set in a position, against the force of its spring, which causes engagement of a catch arm with the timing mechanism. The arming cable assembly 26 actuates the interlock to a release position upon separation of the parachute wearing aviator from the seat or the aircraft. The catch arm is operatively interconnected to a trigger of the overriding aneroid assembly 54, the trigger being disabled above a pre-established altitude to prevent operation of the timing mechanism above the pre-established altitude.

The timing mechanism 56 includes a timing disc having a cam portion which may be manually angularly adjusted relative to a timing gear to preselect the predetermined time interval. The cam portion coacts with a cam follower which is disabled with the interlock in the lock position and enabled when the interlock is in the release position. The cam follower coacts with a second latch which releasably engages the first latch, on contact with the cam portion of the timing disc, to actuate the release mechanism to its second position and thereby actuate the parachute after lapse of a predetermined time period after operation of the catch arm.

In the following description, reference will be made to the apparatus 20 by use of such terms as left, right, clockwise, counterclockwise, forward, reverse, upper, lower, and the like, and such terms, as used herein, are intended to refer to orientations as depicted in the drawings, or orientations in the sense of the particular element to which it refers, and/or the function thereof, and such terms are not intended to be limiting.

Ripcord Release Assembly

Referring to FIGS. 3 through 6, the housing 22 is formed with a longitudinally extending cylindrical borehole 62 which has an axially extending slot 63 formed in the exterior thereof. A piston assembly is positioned within the borehole 62, the assembly including a piston 64 having a head 64a of approximately the same external diameter as the internal diameter 20 of the borehole 62.

The shaft 64b of the pistons 64 is encircled by first and second power coil springs 66 and 68, of different diameters, fitted within one another, which together generate a force in excess of 110 pounds in the first one-half inch of travel of the piston 64 during the release operation to release the ripcord. Spring 68 is of smaller diameter and encircles the shaft 64b, while spring 66 is of larger diameter encircling the inner spring 68. The piston 64 is assembled within the borehole 62 by means of an internal thread 62a at the right end of the borehole 62, as viewed in FIG. 6, the thread matingly receiving a cap member 70 having a centrally located aperture 70a in the bottom thereof for passage therethrough of the end of the shaft 64b.

The other end of the borehole 62 is suitably closed by means of an internal thread 62b threadably receiving a second closed cap member 72, which has mounted in a cup-shaped recess 72a thereof a bumper member 74 formed of a suitable resilient material such as rubber or the like. The bumper member 74 is toroidal in shape and extends inwardly within the borehole 62 a distance beyond the inner edge of cap 72 to absorb the tremendous force of the piston 64 moving to the left as viewed in FIG. 6 under force of the springs 66 and 68. The head 64a of the piston 64 is provided with a piston post 76 which extends laterally through the piston head 64a and through the slot 63, the post 76 being of a pivot pin 79 located at a diameter slightly less than the width of the slot 63 while having a flange at the base thereof which is larger than the slot 63 to prevent the post 76 from exiting the piston head 64a.

Figure 5:
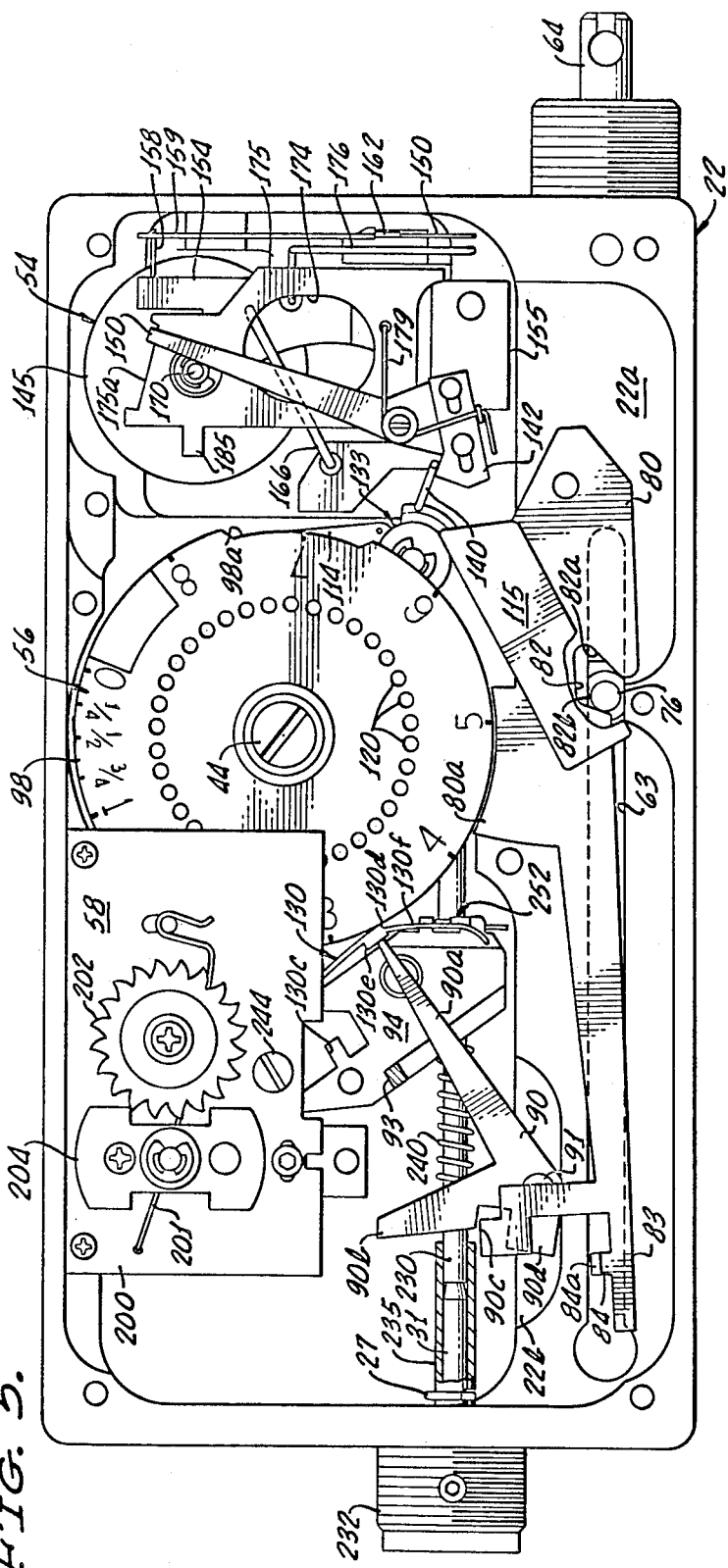
FIG. 5 is a front view similar to FIG. 3 with the components shown in the cocked positions.

As shown in FIGS. 3, 5 and 7, a main latch lever 80, of elongate form, is pivotally coupled at one end to a generally planar recess 22a formed in the housing 22 above the borehole 63. The lever 80 is formed of a sheet steel material which may be stamped or otherwise formed, and bent, as required. When lever 80 pivots, it slides on the planar surface of the recess 22a. At the pivot end of the lever 80, its width is sufficient to overlie the slot 63 for a short distance. The next portion of the lever incorporates a latch detent, generally designated 82. A trailing edge 82a of the lever, at such detent, is shaped as a hook to force rotation of the main latch 80 and second latch 90 during cocking. Such cocking causes post 76 to be held in its position shown in solid lines. The forward edge 82b of lever 80 is slightly canted forwardly to a lower edge 83 which is offset upwardly to allow clearance for the post 76 during actuation of piston 64. As shown, the forward portion of the lever 80 extends a distance slightly greater than the distance of travel of the post 76, shown at its actuated position in dotted lines designated 76', whereby the post 76 is in constant engagement with the edge 83 during travel of piston 64 after being released from latch detent 82.

The tail end of the lever 83 is tapered, and includes first and second upwardly disposed arm portions 84 and 85. Arm 84 is a short arm with a guide portion 84a bent toward the interior of cover 24 for limiting movement between the cover 24 and the generally planar surface of the recess 22a on which the lever 80 pivots. The arm 85 is longer, offset rearwardly at the upper end thereof and bent toward the bottom wall of housing 22 to form a latch tab 85a configured for coacting engagement with a second latch member, generally designated 90.

Latch member 90 is a generally L-shaped lever pivotally coupled at its elbow 91 to the housing at a planar recess 22b that is spaced from recess 22a. Such latch member 90 has a first tapered arm 90a extending through a slot 92 formed in an upwardly extending angle portion 93 of an interlock block 94. As shown more clearly in FIGS. 5 and 7, the second arm 90b is notched at 90c to form a catch ledge for coaction with the latch tab 85a of the first latch member 80.

Figure 6:
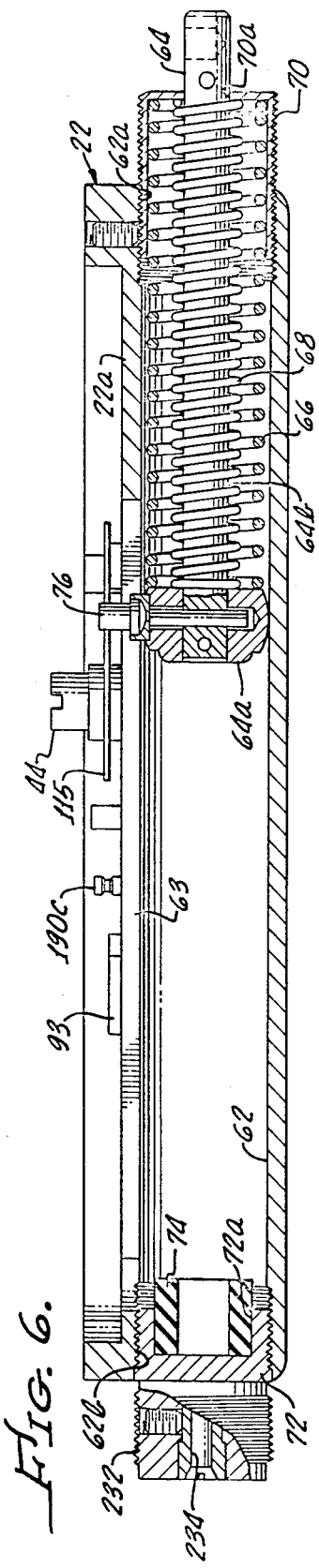
FIG. 6 is a cross-sectional view of the apparatus of FIG. 4, taken along line 6—6 thereof, showing details of the spring-powered ripcord release mechanism.

FIGS. 5 and 6 depict the mechanism in its cocked condition, that is, with the springs 66 and 68 fully compressed by the retracted piston 64. In this position, the first latch member 80 is biased in a clockwise manner, the piston post 76 being within the latch detent 82. The latch 80 is maintained in this position by the latch tab 85a (FIG. 7) being urged against the stop notch 90c by the force of the springs 66 and 68 that urge the latch member 80 clockwise. The latch member 90 includes a third short arm 90d which is formed beneath the notch 90c and extends rearwardly of arm 90a and angularly upwards relative thereto. This arm 90d coacts with latch tab 85a when first latch member 80 is pivoted in the counterclockwise direction during cocking, to thus pivot the second latch member 90 in the counterclockwise direction for latching. The interlock mechanism 60 will be described more fully hereafter along with the arming mechanism 26.

Timing Mechanism

Referring now to FIGS. 3 through 5 and 9 through 12, the timing mechanism 56 will be described. The timing mechanism 56 includes a timing disc member 98, mounted atop, and positionable relative to, a large diameter separate timing gear 100. Gear 100 is driven by a coil spring 102 encircling a hub 104 that is integrally formed with the timing disc 98 (See FIGS. 9, 11, and 12), the hub 104 having an axially extending journal opening 105 therein. The timing adjustment screw 44 is likewise integrally formed with the disc 98 by an axially extending shaft at the center thereof, extending in a direction opposite to the hub 104. As shown, the timing gear 100 is of a diameter slightly smaller than the diameter of the timing disc 98, and is coupled in abutting relation to a gear plate 106 by suitable means such as screws 107. One end of the coil spring 102 is secured to the gear plate 106 by a screw 108 while the other end is secured relative to the bottom of the housing 22 by a screw 109 passed through the bottom thereof (See FIG. 9).

As shown in FIG. 9, the timing mechanism 56 is attached within the housing 22 by means of an axle member 110 having a disc-shaped flange 111 at one end thereof positioned within and secured to a circular recess 23 formed in the outer wall of the housing 22, the recess 23 being concentric with a smaller diameter opening 23a, which is of a diameter slightly greater than the diameter of the hub 104. The timing disc 98 is mounted by positioning the journal opening 105 of the hub 104 thereof into rotatable engagement with the axle member 110, the terminal end of the hub 104 being within the periphery of opening 23a and below the interior wall of the housing 22.

A stop pin 112 is secured within an aperture through the gear plate 106 and gear member 100. Pin 112 extends in an axial direction, parallel to the axis of rotation of the gear 100, at a radial distance equal to the distance between the axis and the spring screw 109. The stop pin 112 is positioned to abut against screw member 109 upon winding as will be hereafter described, and limits rotation of the timing gear member 100 to an angle of about 330 degrees.

During assembly, the flange 111 of the axle member 110 is secured to the housing, such as by screws 111a. The screw 109 is then partially inserted into the housing 22 through its threaded aperture a distance sufficient to receive the hooked end of the coil spring 102 but not enough to engage the stop pin 112. With the other hooked end of the coil spring 102 secured to the gear plate 106, as the hub 104 is positioned (with the journal 105 rotatably engaging the axle member 110), spring 102 is prestressed by being wound an initial amount of approximately two and one-half turns, after which the screw 109 is fully threaded into its aperture until in the position shown in FIG. 9. At this position, upon clockwise turning of the gear 100 during winding, at a position just under one full turn, the stop pin 112 will abut against screw 109.

As shown in FIG. 11, the gear plate 106 is provided with a catch notch 113 which receives therein the end of a catch arm 114 (See also FIG. 4). At this limit of rotation, the end 114a of the catch arm 114 is positioned within the catch notch 113 to lock the gear plate 106, and thus gear member 100, against rotation and despite the force of the spring 102.

With the gear member 100 thus locked by the coaction of catch arm 114 within catch notch 113, timing disc 98 may be angularly positioned relative to the timing gear 100. This is done by insertion of a screw driver into adjustment screw head 44. For such angular positioning, the disc 98 is provided with a plurality of equiangularly spaced apertures 120 disposed about a circle at a given radius (See FIGS. 3 through 5). Apertures 120 are positioned to detentingly coact with three equally spaced ball plunger mechanisms (See FIG. 9), each including a ball 121 positioned within a cup-shaped recess 122 formed in the gear 100 and gear plate 106. A spring 123 within the recess 122 urges the ball 121 into partial intrusion into the aperture 120. The diameter of aperture 120 is much smaller than the diameter of the ball 121. For enabling precision positioning of the timing disc 98 relative to the timing gear 100, the apertures are positioned ten degrees apart, that is, there are thirty-six apertures 120 about a circle lying within the plane of the disc 98, with ten degrees equalling ¼ second.

Precision in the timing is obtained as follows. In the timing mechanism 56 of the apparatus 20, the timing disc 98 has a diameter of approximately 2.1 inches which provides a disc 98 circumference of approximately 6.6 inches. The timing gear 100 and the escapement mechanism 58 are constructed to provide approximately 8 seconds duration for the 330 degrees of travel of the timing disc 98. Adjustments for precision timing intervals is accomplished by means of adjustment of the escapement mechanism 58 as will be hereafter discussed. After adjustment, a distance of 0.220 inch of travel of the circumference of the timing disc 98 is equal to 0.250 seconds. This 0.220 inch of travel on the circumference is equal to ten degrees of angular displacement of the timing disc 98, the arc distance between the apertures 120.

As depicted in FIG. 3, the periphery of the timing disc 98 is provided with a cam portion 98a, which is essentially a cutaway arcuate segment of reduced diameter. A cam follower arm 130 (FIG. 4) in the form of a leaf spring member is normally biased toward, and in abutting relation with, the perimeter of the disc 98. As will be described, after winding of the timing mechanism 56, and appropriate release thereof after all conditions have been met, this cam portion 98a of the timing disc 98 will travel counterclockwise (as viewed in FIG. 3) under force of the spring 102. After expiration of the preselected time interval, the cam follower arm 130, under force of its bias, will come into engagement with the cam portion 98a, thus permitting movement of the cam follower arm 130 (under certain conditions to be hereafter described) to the right. Thus enables clockwise pivoting of the second latch member 90 as a consequence of the force of springs 66 and 68 urging first latch member 80 clockwise.

The position of a V-shaped edge of the cam follower arm 130 relative to the timing disc 98 is adjustable by means of the slotted coupling of the arm 130 to the interlock block 94. To initially set the "zero" time, the V-shaped edge of the arm 130 is positioned relative to the circumference of the disc with the "0" indication on the timing disc, lining up with a pointer P on the section 80a (FIG. 7) of the first latch 80. Then, to set the time interval for one-quarter second, the point of this V-shaped edge in abutting relation with the circumference of the timing disc 98 is adjusted to a position where the beginning of the cam portion 98a is spaced 0.220 of an inch therefrom. Stated otherwise, the cam portion 98a edge is two hundred twenty thousandths of an inch away in a clockwise direction from the V-shaped point of the cam follower arm 130. At this position, the timing mechanism 56 is operable within timing intervals of one-quarter second accurately and repeatably within ten milliseconds. With a larger diameter disc 98 and/or a greater number of apertures 120 positioned within smaller angular relation, smaller timing intervals are obtainable.

Referring now to FIGS. 3 through 5, 8 and 10, the catch assembly 55 includes a pivotal block 133 formed from a rod and cut to have first and second oppositely disposed arcuate sectors or segments 133a and 133b, thus providing an hourglass appearance. The block 133 is biased clockwise, as viewed in FIG. 4, by means of a spring member 134. Spring 134 coils about the pivot shaft 139 and has one end thereof hooked over a stud 135 secured to the bottom of the housing 22, and the other thereof secured over a pin 136 protruding from the bottom of segment 133a (See FIG. 10).

The catch arm 114 is attached to the block 133, and is pivotal relative thereto. Also formed as part of the catch arm 114 is a flag member 115 (FIG. 8) which is affixed to the lower end thereof, and is pivotable from a first position shown in FIG. 3 where the flag member 115 covers the numbers on the timing disc 98 to a second position shown in FIG. 5 where the numbers are viewable through the window 45 of the front cover 24. The purpose of the flag member 115 will be discussed more fully hereinafter in the description of operation.

Referring to FIGS. 4, 8 and 10, a second spring member 138 has the coil thereof encircling the pivot shaft 139, one end of the spring being secured to the arm 114 at 138a, and the other end being being secured to the pivot block at 138b. The force of the spring 138 biases the arm 114 in a counterclockwise direction. The arm 114 is limited in its angular movement by stop ledges 133c and 133d (FIG. 8) formed, respectively, in the segments 133a and 133b at the periphery thereof.

Fixedly mounted to the block segment 133a, and extending outwardly and generally radially relative to the block 133, is a generally L-shaped bent lockout rod 140, which (as will be hereafter described) coacts with the aneroid mechanism 54 to preclude operation of the timing mechanism 56 in the event the apparatus 20 is above a pre-established altitude. Referring to FIGS. 5 and 10, the lockout rod 140 engages a slide tab 142 of a trigger 150 of the aneroid mechanism 54, and with the timing mechanism fully wound with the catch arm end 114a engaged within catch notch 113, and with trigger 150 prevented from pivoting, the block 133 is likewise precluded from pivoting, thus disabling or locking out the timing mechanism 56.

Aneroid Capsule Module

Referring now specifically to FIGS. 13 through 18, and generally to FIGS. 3 and 5, the aneroid capsule module 54 will be described. For ease of assembly the module 54 is assembled on a plate 144 which may be inserted into an opening in the rear wall of the housing 22, and secured thereto such as by screws passing through apertures 144a in plate 144, after which the plate 144 essentially becomes a part of the housing 22. A bellows assembly 145 in the form of four top to bottom mounted aneroid capsules 145a-145d is secured adjacent one end of the plate 144. The lowermost capsule 145a includes a mounting stud 146 which passes through a threaded opening in the plate 144 for securing the bellows 145 thereto, and for providing initial axial adjustment of the bellows 145.

Affixed adjacent the other end of the plate 144 is a supporting structure which includes a pair of spaced pivot frame members 147 and 148 extending generally perpendicular thereto (See FIG. 16). A third pivot frame member 149 is positioned adjacent one edge of plate 144 in proximity to the bellows 145. Pivotally attached to the pivot frame members 147 and 148 is a bellows pivot plate 154 which is a generally rectangular metal plate having a metal block 155 attached to the rear thereof, there being a hinge pin 156 passing therethrough and into rotatable engagement with pivot frame members 147 and 148. The other end of pivot plate 154 is fixedly attached to the center support boss 157 of the uppermost aneroid capsule 145d. As shown in FIG. 15, the block 155 has the center of mass thereof positioned on the side of the pivot hinge pin opposite the center of mass of the pivot plate 154 to act as a counterbalance, and thus eliminate the weight of the pivot plate 154 and bellows 145 as a factor in the axial movement of the aneroid bellows 145 during high "G" forces. At lower altitudes, the capsules 145a-145d will contract, and conversely, at higher altitudes, will expand. This action provides axial movement to the boss 157 of capsule 145d which translates into pivotal movement of the bellows pivot plate 154. As viewed in FIG. 15, this pivoting of plate 154 will be clockwise when ascending to higher altitudes and counterclockwise when descending to lower altitudes.

This expansion and contraction is visually ascertainable by means of the indicator scale 50 (See also FIG. 2) which is viewable through the window 49 in the side (end) of the housing 22. As shown in FIGS. 13 and 14, the edge of the bellows pivot plate 154 has connected thereto a laterally extending actuator pin 158 which is engaged within a slot 159. Such slot is formed in one end of an indicator arm 160 which is pivotally secured, at the approximate midpoint thereof, to the pivot frame member 149 by a hinge pin 161. The other end of arm 160 has connected thereto a pointer 162 which, as the ambient pressure changes, traverses the scale of the indicator 50, which is fixedly attached to the pivot frame member 148.

Manufacturing tolerances of the individual capsules 145a–145d result in different expansion rates for each capsule. The present apparatus contains means for adjustment to compensate for these tolerances. A cantilevered spring member 166 has an axle portion 166a (FIG. 13) pivotally coupled with an opening in an extension of the pivot arm 147. The spring member 166 has the free end 166b thereof barely contacting the upper surface of the bellows pivot plate 154. This cantilevered spring member 166 provides a variable spring rate which may be adjusted by pivoting of the free end 166b of member 166 into contact with the surface of plate 154 at one of a number of positions, such as the phantom line position designated 166'. In general, the nearer the end 166b to the boss 157 of the bellows 145, the greater the spring rate to resist the expansion of the bellows 145. Conversely, the further away, the less the resisting force. Once positioned where desired, the position may be fixed by tightening a set screw 167 in pivot arm 147 into engagement with the axle portion 166a (See FIG. 13).

The axial position of the bellows 145 of the aneroid capsule module 54 is used to provide lockout means for the timing mechanism 56. For this purpose, the boss 157 of the bellows 145 has an axially extending lockout or stop pin 170 which is centrally disposed relative to a circular opening 171 of a trigger plate member 175, which has pivotally mounted thereon the trigger member 150. The trigger plate member 175 at one end thereof is provided with downwardly depending pivot projections 172 and 173 (See FIG. 16) which are pivotally coupled to frame members 147 and 148 by the hinge pin 156 passing therethrough. The central portion of trigger plate member 175 has an enlarged opening 174 which serves initially to reduce the weight of the plate member 175 while providing access for positioning of the cantilevered spring tension member 166.

For assembling the trigger 150 to the trigger plate member 175 is ramped, the forward edge 175a of plate member 175 in proximate relation to the opening 171, that is to say, the edge 175a is at an angle to the axis of the hinge pin 156. The trigger 150 has a long tapered arm 150a and a short wedge-shaped arm 150b on opposite sides of the pivot axis 177, the arm 150a having the tip thereof bent around the edge 175a for slidable retention thereon during pivoting (See FIGS. 13 and 14). The trigger plated member 175 (See FIGS. 3 and 14) is provided with a bent spring member 176 which has one end thereof secured to the plate 144 and the other end thereof hooked into the opening 174 of the trigger plate member 175 to pivot the end 175a upwardly, that is, toward the interior of the cover 24.

The short arm 150b of the trigger 150 has slidably assembled thereon a slide tab 142, which is a generally rectangular piece of sheet metal with a pair of axially aligned slots 142a and 142b through which extend fasteners 178 and 178', respectively. The fasteners are fixedly attached to the short arm 150b at the base thereof opposite the apex at the pivot axis 177. The slide tab 142 is thus slidable through a predetermined distance determined by the length of the slots 142a and 142b. The leftmost end, as viewed in FIG. 13, of the tab 142 is provided with a triangularly configured, or pointed, edge 142c. Such edge is configured for selectively captively engaging a lockout rod 140 that is part of the catch assembly previously described (See FIGS. 3 and 4).

The slide tab 142 is normally biased to the left as viewed in FIG. 13, this being accomplished by a torsion spring member 179 having the central coil portion thereof encircling the pivot axis 177. The end of one arm 179a of the spring is bent downwardly through an aperture in the trigger plate member 175, and the end of the other arm 179b thereof engages a slit in a bent tang 142d (FIG. 14) of the tab slide member 142. Thus, the normal position of the slide tab 142 is the solid line position shown in FIG. 13. Due to the limited sliding movement of the slide 142, this bias force of spring 179 is also applied to the trigger 150, which would normally be biased clockwise as viewed in FIG. 13. However, as will be hereafter described in conjunction with the operation of the apparatus 20, this bias force is overcome momentarily by the lockout rod 140 of the catch assembly (FIG. 8), which pivots the trigger 150 counterclockwise.

In order to establish the altitude at which the stop pin 170 is overridden by the trigger 150, the altitude adjustment screw 46 rotatably retained by the cover 24 of the housing 22 includes a cam member 180 coupled thereto, as shown in FIG. 17. The cam member 180 is generally cup-shaped, having the periphery thereof being a ramped or cam cylinder with a stop tab 180a to limit rotation thereof. The adjustment screw 46 has a reduced diameter axle portion 46b and a larger diameter flange portion 46a fitting in a circular recess 24a of the cover 24, the axle portion 46a passing through a circular aperture 24b. The cam member 180 has a larger diameter than the aperture 24b and is secured to the screw member 46 by suitable means such as screws 181.

For coaction with the cam edge of the cam member 180, the trigger plate member 175 is provided with a laterally extending co-planar cam follower projection 185. As shown in FIG. 13, the cam member 180 edge, shown in dotted lines, coacts with the cam foller projection 185 to limit upward pivotal movement thereof, and to preset the axial displacement of the plane of the trigger 150 relative to the axial expansion line of the bellows 145 on which the stop pin 170 travels. Altitude setting is thus accomplished by rotating the adjustment screw 46 until the pointer thereon is preset to the number on the altitude indicator plate 47 indicative of the desired altitude below which the timing mechanism 56 is activated. This angular position of the screw 46 presets the edge of the cam 180 to an axial displacement position of trigger plate member 175, and consequently trigger 150, which correlates with the desired altitude indication.

During assembly, with the module 54 at a pressure corresponding to sea level, the bellows 145 is contracted. The cam 180 is rotated to a position indicating sea level, thereby adjusting the position of the trigger 150 on trigger plate 175 relative to the upper edge of stop pin 170. The bellows 145 is adjusted by means of its screw 146 to enable the trigger 150 to fire or just retract when stop pin 170 just clears the bottom of the trigger 150 when the trigger plate 175 is at its maximum distance against the force of its spring 176. The altitude adjusting cam 180, at this position, is made for a bellows stroke of 0.120 inch. The reason for this is the variance detected in manufacturing tolerances of the bellows 145. With a "stiff" bellows 145, the detected stroke is 0.120 inch when the device is taken from sea-level pressure to a pressure equivalent to that at 20,000 feet. With a less stiff bellows, the stroke will be about 0.140 inch.

The apparatus 20 is then set for an altitude of 20,000 feet, with the cam 180 rotated to a position indicative thereof. When the cam 180 is rotated to indicate a higher altitude, the trigger plate member 175 pivots away from the stop pin 170, thereby increasing the distance between the end of the stop pin 170 and the undersurface of the trigger 150. The pressure of a variable-pressure test chamber having the apparatus 20 therein is then varied to correspond to that at 20,000 feet, and the apparatus 20 is fired. Since the 0.120 inch stroke is a "worst case" situation of a "stiff" bellows 145, the apparatus 20 will always fire at an altitude below 20,000 feet. This is because nany less stiff bellows will have a greater stroke, that is, for the same difference in pressure, it will stroke more than the allowed 0.120 inch.

The cantiliver spring 166 is then adjusted to increase the spring rate of the bellows 145 assembly. This is accomplished by pivoting the end 166b of spring 166 relative to the bellows pivot plate member 154 to some position intermediate the pivot axis thereof and the stop pin 170. The position is selected to correspond to a position which decreases the stroke of the bellows 145 sufficiently to bring it back to the allowed tolerance level of 0.120 inch stroke. When this is accomplished, the spring 166 is locked in position by its set screw 167.

In the operation of the parachute-release apparatus 20, as the bellows 145 expands or contracts in accordance with ambient altitude, the position of the stop pin 170 varies, and at high altitudes, extends into and through the circular opening 171 of the trigger plate member 175. Stop pin 170 then acts as a stop to prevent counterclockwise pivoting of the trigger 150 (See FIGS. 13 and 15) under force of pivoting of the lockout rod 140 after the interlock assembly 60 has been set as will be hereafter described.

The upward force of spring 176 on trigger plate member 175 forces cam follower projection 185 against the edge of the cam member 180. As the bellows 145 contracts, the stop pin 170 will ultimately, at the pre-established altitude, axially descend from engagement with the trigger 150, thereby permitting counterclockwise pivoting of the trigger 150 to release the catch assembly lockout rod 140 and thereby permit timing out of the timing mechanism 56.

The aneroid capsule module 54 is constructed and assembled to minimize the impact of high gravitational forces in the environment in which it is used, and to provide a margin of safety to the user of the apparatus.

The bellows pivot plate member 154, being coupled to the boss 157 of the bellows 145, provides for accurate positioning of the stop pin 170, the movement of which essentially defines an arc. The trigger 150 when pivoting on trigger plate member 175 likewise defines an arc tracking the stop pin 170. The externally viewable "altitude" indicator 50 on the edge of the housing 22 provides a safety margin in the event one of the capsules 145a-145d leaks, in which event the indication will not correspond to the actual elevation at the particular airfield.

As depicted in FIG. 15, between each adjacent pair of capsules, such as capsules 145a and 145b, a washer shaped rubber cushion member 188 is positioned. Each cushion member 188 has an enlarged periphery fitting between, but spaced slightly from, the adjacent recessed surfaces of the aneroid capsules such as 145a and 145b. These cushion members 188 minimize permanent deflection or bending of the bellows 145 about the axis thereof in the event of high "G" forces applied in any direction, and serve to stabilize the bellows 145.

Escapement Mechanism

Referring now specifically to FIGS. 19 and 20, and generally to FIGS. 3, 4 and 5, the escapement mechanism 58, and its intercooperative relation with the timing mechanism 56, will now be described. The escapement mechanism 58 is assembled on a mounting plate 200, which has rotatably mounted thereon a star wheel 202 for coaction with an escapement mass balance 204. The star wheel 202 has an elongate shaft 206 on which a pinion gear portion 208 is provided adjacent the end thereof. The extreme end 206a has a reduced diameter and is received within a journal aperture in the rear wall of the housing 22. As shown in FIGS. 4 and 5, the timing gear 100 is meshed with a pinion gear portion 190a of a gear member 190 having a large diameter spur gear portion 190b, the latter being meshed with the pinion gear portion 208 of the star wheel 202. Upon unwinding of the timing mechanism 56, the timing gear 100 drives the star wheel 202 under force of the timing spring 102, with the speed of the timing gear being governed by the interaction with the escapement mass balance 204.

The mass balance 204 is symmetricaly configured so that the center of mass is identical to the center of pivoting. Where the center of mass is offset from the center of pivoting by even a small amount, for example fifty or one hundred thousandths of an inch, and with high transient or sudden "G" forces, the force exerted at the center of mass locks the balance against the escapement gear and thus disables, or "locks up", the escapement mechanism.

The gear 190 of the escapement mechanism 58 is a "movable gear". Accordingly, during winding of the timing mechanism 56, the pinion gear portion 190a is urged away from the teeth of the timing gear 100. This is done in the following manner. The upper end 190c of the shaft of gear member 190 is of a reduced diameter, and extends into a slot 200d in the escapement mounting plate 200 upon assembly (See FIG. 19). The end 190c has a peripheral recess spaced from the outer edge thereof, and extends through the slot 200d a distance sufficient for the hook-shaped end 201a of a wire spring member 201 to be received within the recess. The other end 201b of the wire is suitably bent for passage through an aperture 200e in plate 200. The spring 201 abuts, at a midpoint, against the balance shaft 210 (See FIG. 20).

In this manner, the end 190c of movable gear member 190 is normally biased downwardly within the slot 200d as viewed in FIG. 19. Upon winding of the timing mechanism, the winding screw 44, as shown in FIG. 4, is turned clockwise. This causes clockwise motion of timing gear 100, which attempts to turn the pinion gear portion 190a counterclockwise, thus forcing the end 190c of the shaft of gear 190 upwardly in the slot 200d as viewed in (FIG. 19) to the dotted line position 190c' against the force of the spring 201. When all conditions are met, and the timing gear 100 is free to rotate counterclockwise to pace off the preset time period, the energy in the timing gear 100, as viewed in FIG. 4, will force the pinion gear portion 190a and its shaft end 190c member 190 downwardly (FIG. 19) in the slot 200d against the bottom thereof to the solid line position shown in FIG. 19. Then, the gear portion 190a is in meshing engagement, and rotating with, the timing gear 100.

In order to adjustably position the mass balance 204 relative to the star wheel 202, as shown in FIG. 19, the balance 204 is rotatably mounted to one end 210b of a shaft 210. The other end 210a of such shaft is of a reduced diameter and is press fit into an opening 211 of a balance mounting bar 212 (FIG. 20). The one end 210b has mounted thereon a flanged bearing 214 which is secured within a central opening 204a of the balance 204, and is retained thereon by a U-shaped clip 215 and washer 215b (FIG. 20).

The balance mounting bar 212 is secured to the reverse side of the escapement mounting plate 200 by means of a pair of screws 216 and 218. The upper (as viewed in FIG. 19) screw 216 passes through an opening 200a of the mounting plate 200 into threadable engagment with a threaded aperture 212a of the balance mounting bar 212. The lower screw 218 is a cap screw which passes through an enlarged arcuate slotted opening 200b in the escapement mounting plate 200 and into threaded engagement with a threaded aperture 212b in the balance mounting bar 212. In this manner, the angular position and proximate relation of the balance 204 relative to the star wheel 202 may be, to change the speed of star-wheel rotation, by loosening the upper screw 216 which is accessible through an opening 204b of the balance 204. The cap screw 218 may then be loosened, and the rear balance mounting bar 212 may be anguarly adjusted relative to the front escapement mounting plate 200 through the angular limits of the arcuate slot 200b. To facilitate this adjustment, the opening 200c of the front plate 200 through which the shaft 210 passes, is enlarged to allow the relative movement required, and the lower end of the bar 212 projects below (FIG. 20) the plate 200. There is an opening 212c in bar 212, into which a tool may be inserted for angular positioning of the bar prior to complete tightening of cap screw 218.

Interlock Assembly and Arming Mechanism

Referring now to FIGS. 21 and 22 specifically, and FIGS. 3 through 5 generally, the interlock mechanism 60 and arming mechanism 26 will be discussed.

Briefly, the interlock 60 is interoperatively connected to coact with the cam follower arm 130, one segment 133a of the catch assembly, and an arming pin of the arming mechanism 26. For this purpose, there is provided an interlock rod 230 (FIG. 4) axially slidable within the housing 22, in spaced and generally parallel relation to the piston 64 of the ripcord release assembly 52.

The housing 22, in an end thereof, on the exterior, is provided with a threaded coupler 232 having an axial bore 234 for providing access to the housing. The bore 234 is lined with a sleeve or bushing 235 which extends into the housing a given distance for receiving therein, in slidable relation, one end of the interlock lockout rod 230. The rod 230 passes through an aperture 236 in the interlock block 94, which serves as a second bearing support for the rod 230 (See FIG. 22). Formed in the interlock block 94 is a cup-shaped recess 237 of larger diameter and coaxial with the aperture 236, the bottom of this recess 237 serving as a shoulder for a compression spring 240 that encircles a portion of the interlock rod 230. The other end of the spring 240 is held in fixed position relative to the rod 230 by means of a washer-shaped clip 242 in captive relation on the rod 230. The normal force of the bias of the spring 240, as viewed in FIGS. 4, 21 and 22 is to the left, that is, the spring 240 is urging the rod 230 into the bushing 235 to the position shown in FIG. 4.

As shown in FIG. 4, the cam follower arm 130 is mounted on the interlock block 94. Arm 130 is formed of a resilient or spring like sheet metal. One end of the arm is bent to form a mounting portion 130a FIG. 7 having a slot 130b and a peripheral notch 130c formed therein. A screw 244 (See also FIG. 5) pases through an aperture 200f (FIG. 19) in the escapement mechanism mounting plate 200, and through the slot 130b and through an aperture in the interlock block 94, into threadable engagement with an aperture formed in the rear wall of the housing 22. The position of the arm 130 may be adjusted relative to the cam portion 98a of timing disc 98, within the limits of the slot 130b, by insertion of a tool, such as a screwdriver, into the notch 130c.

The cam follower arm 130 is bent in the form of a leaf spring and, incorporated a V-shaped detent 130d having a cap portion 130e. The exterior of detent 130d forms a sharp edge for tracking against the timing disc 98 while the interior provides a pointed recess for engagement with the tapered end of the arm 90a of the second latch member 90, thus detentedly engaging the end of arm 90a in the position shown in FIG. 5. The cap portion 130e prevents the end of arm 90a from rising atop the arm 130, when in the latched position, upon subjection of apparatus 20 to excessive gravitational forces.

The interlock assembly 60 includes provision for locking the free end 130f of cam follower arm 130, reference being made to FIG. 22. For this purpose, the rod 230 has fixedly attached thereto a shoulder member 250 which normally fits within a second cup-shaped recess 249 coaxial with the aperture 236 of the interlock block 94. Immediately above the shoulder member 250, a somewhat L-shaped lock tab 252 is pivotally coupled to the interlock block 94 by a pivot pin 253, the lock tab 252 having a first arm 252a and a second arm 252b.

FIG. 22 shows in solid lines the normal position of the shoulder 250 and the arms 252a and 252b. Normally, the shoulder 250 is substantially within the recess 249, and the lock tab 252 is pivoted so that arm 252b is depending with the surface thereof in abutting relation with the outer end of shoulder 250, the arm 252a being angularly directed upwardly and outwardly. As shown, the lower arm 252b is bent outwardly of the pivot pin 253, which is positioned at a point just rearwardly of the front edge of the shoulder 250 in its normal position. The front or leading edge of the shoulder 250 is rounded so as to act as a cam during operation to the dotted line position shown and designated 250', the tab 252 then being pivoted counterclockwise to the illustrated dashed line position. Arm 252a is then generally vertical and in abutting locking relation with the end 130f of cam follower arm 130 (See FIG. 5). At this point, the arm 252b is forced to the right as viewed in FIGS. 21 and 22, until the lower edge of arm 252b rides atop the shoulder 250. The locked position of arm 252a relative to the end 130f of cam follower arm 130 is depicted in FIG. 5.

As shown in FIGS. 4 and 21, the free end of the interlock rod 230 is in axial alignment with a radius edge of the sector portion 133a of the timing mechanism catch assembly. Thus axial movement of the rod 230 pivots the catch block 133 counterclockwise to engage the catch arm 144 as previously discussed.

Referring now to FIG. 4, the axial displacement of the interlock rod 230 is accomplished by means of a rod member 31 which is rigidly attached to the end of the cable 30 of the arming cable assembly 26. With the connector 28 threadably engaged on the threaded male connector 232 secured to the housing 22, the rod member 31 passes through the bushing 235. The bushing 235 is slotted on one side to form a slot 235a into adapted to is inserted a horseshoe spring clip 27 which detentably engage a necked down portion 31a at the approximate midpoint of rod member 31.

The mechanism is set when the rod member 31 is inserted fully within the bushing 235 into detenting engagement between the rod portion 31a and the spring clip 27, this position being shown in FIG. 5 wherein the interlock rod 230 has been shifted to the right against the force of its bias spring 240. Release of the set, or "arming", is accomplished when the aviator exits the aircraft. For this purpose, the connector 32 (FIG. 1) is a separable connector. One end 32a is affixed to the aircraft or to the pilot's seat, while the other end 32b is secured to the sheath 29 which is ultimately fixedly attached to the apparatus 20 which exits the craft along with the aviator and his parachute. As the parachute wearing aviator separates from the craft or the seat (when an ejection mechanism is employed to eject the seat), the connector portion 32a separates from connector portion 32b. As connector portion 32a moves along the cable 30, the opening therein engages the enlarged ball 30a fixed to the end of the cable 30 to apply force to the cable 30, thus pulling the rod member 31 out of engagement with the spring clip 27. Thus, the interlock rod 230 is permitted to move axially left, as viewed in FIGS. 3 through 5, to permit the aneroid capsule module 54 and the timing mechanism 56 to operate.

SUMMARY OF OPERATION

In summarizing the operation of the apparatus 20 according to the invention, FIGS. 23 through 29 depict some of the major operative components. Many of the reference numerals have been omitted for clarity and ease of description. The discussion will proceed with reference to each of the functional conditions which apply, in the sequence of operation.

(1) Normal Position (FIG. 23)

In FIG. 23, the component parts are depicted in the normal position, that is, the fired or released positions in which the timing mechanism 56 has not been wound, the spring powered ripcord release mechanism 52 has not been set, and the interlock mechanism 60 has not been set. In this condition, the interlock rod 230 will be in the fully-left position. The catch pivot block 133 and the catch arm 114 will be pivoted clockwise, and the catch notch 113 of gear plate 106 will be below the end 114a of catch arm 114.

The bias of cam follower arm 130 will urge it into abutting relation with the periphery of the timing disc 98. The aneroid lockout pin 140 will be in the position out of engagement with the slide tab 142 of the trigger 150 of the aneroid capule module 54. The flag member 115 will be in the position at which it covers the numbers of the timing disc 98, would otherwise be viewable through the window 45 of the front cover 24.

Also in this condition, the piston 64 of the ripcord release mechanism 52 will have the piston post 76 thereof at its leftmost position. The piston post 76 thus bears against the lower edge 83 of the first latch member 80 which is in clockwise-pivoted position. In this position, in addition to the flag member 115 covering the numbers of the timing disc, an upper extension 80a of the first latch member 80 is configured for likewise covering the numbers. Extension 80a of latch member 80 is in generally parallel relation to the flag member 115, with flag member 115 thereabove. In the event either the timing mechanism 56 is not wound, or the spring of the ripcord release mechanism 52 has not been compressed and the piston 64 set, then, in either or both instances the numbers of the timing disc 98 are blocked from view through the window 45. These serve as visual safety indicators for the user of the apparatus 20.

With the latch 80 urged clockwise, the arm 85 of the latch 80 abuts against the rearward ramped edge of the tapered arm 90b of the second latch member 90, urging it clockwise to the position shown. The tapered end of arm 90a of latch 90 will be on the upper edge of the end 130f of the cam follower arm 130.

(2) Interlock Mechanism Set (FIG. 24)

Next in sequence, the rod member 31 is inserted into detenting engagement with the spring clip 27 to set the interlock mechanism 60. The interlock rod 230 is then forced to the right, as viewed in FIG. 24, whereupon the shoulder 250 of interlock rod 230 pivots lock tab 252 upwardly (See also FIG. 22) into relation with the cam follower arm 130 thereby locking it against the force of its bias. Simultaneously, the edge of the sector portion 133a of the catch assembly pivot block 133 is engaged by the end of the interlock rod 230 pivoting the pivot block 133 counterclockwise until the catch edge 114a of catch arm 114 is abutting against the peripheral edge of gear plate member 106. Due to the relative movement provided between catch arm 114 and pivot block 133, the pivot block 133 rotates through an additional angle after the edge 114a abuts against gear plate member 106. Due to this slight angular movement of the catch arm 114, the flag 115 attached thereto drops through a slight angle, while still covering the numbers on the timing disc 100.

As the pivot block 133 rotates counterclockwise, the lockout rod 140 thereof pivots simultaneously. During this pivoting the rod 140 urges slide tab 142 of trigger 150 to the right until the rod 140 is above the edge 142c, whereupon the slide tab 142 recovers under force of its bias to the position shown with rod 140 trapped by tab 142. The remaining parts of the apparatus remain in the positions previously described.

(3) Ripcord Release Mechanism Set (FIG. 25)

By reference to FIG. 25, the aviator sets the piston 64 by drawing on cable 40 of the ripcord release cable mechanism 36. As the cable 40 is withdrawn the piston post 76 travels to the right as viewed in FIGS. 4 and 5, and engages the ramp edge 82a of notch 80. This edge extends across the slot 63 and must be engaged by the post 76. The continued movement of piston post 76 thereafter imparts a counterclockwise pivotal movement for the first latch 80. During this movement, the inwardly bent latch tab 85a of latch 80 bears down on the upper edge of arm 90d of second latch 90, thereby pivoting latch 90 counterclockwise.

As this motion commences, the end of the tapered arm 90a rides counterclockwise up the reduced width, or tapered, edge of portion 130f of cam follower arm 130, and arm 90a is forced to bend as the result of such riding. The portion 130f is bowed so that at detent 130d the tapered end of arm 90a is out of engagement with the portion 130f, and further movement of tapered arm 90a enables the end thereof to spring down and to engage detent 130d beneath the cap portion 130e. At this point, the latch tab 85a is within the notch 90c of latch 90. Release of the tension on the cable 40 at this point causes slight movement of the piston post 76 to the left until it engages the front ramped edge 82b of the notch 82 of the latch member 80. The latch 80 is then locked in the position shown. With the post 76 attempting to move forwardly, the latch tab 85a of arm 85 is forced upwardly in abutting relation with the upper edge of notch 90c of latch 90, and further movement is restrained. The balance of the components remain in the position previously occupied in FIG. 24.

With the first latch 80 set, the portion 80a thereof drops below the timing disc 100, uncovering the numbers. However, flag 115 is still covering the numbers on the timing disc 100.

Figure 26:
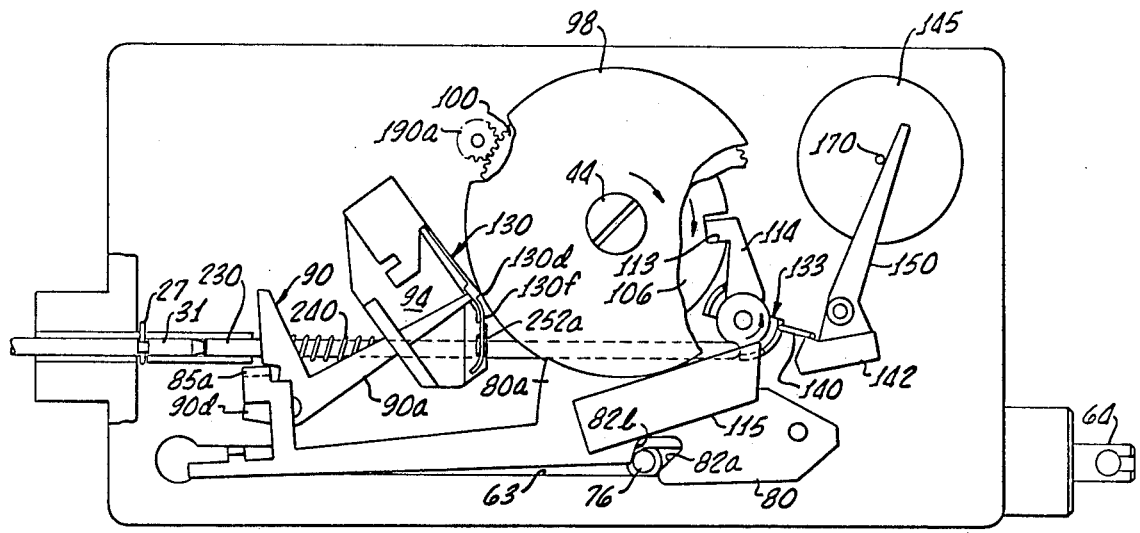
FIG. 26 is a front view of the apparatus showing the major operative components in respective positions after the timing mechanism has been wound.

(4) Winding of the Timing Mechanism (FIG. 26)

Referring now to FIG. 26, the timing mechanism 56 is wound by insertion of a screwdriver into the slot of the timing adjustment screw 44, which is rotated clockwise as indicated by the arrow on gear plate member 106, thus storing additional energy in the power spring. The gear plate member 106 is rotated until catch arm 114 is permitted under force of its bias to pivot an additional increment relative to the now stationary pivot block 133, whereupon the end 114a of catch arm enters the catch notch 113 in the gear plate member 106. As the catch arm 114 pivots this additional angle, the flag member 115 likewise pivots until the numbers on the timing disc 98 are viewable through the window 47 of the cover 24. At this position, with the gear plate member 106 thus restrained, the timing disc 98 may be rotated relative to the gear plate member 106 by further clockwise rotation of the screw 44 until the desired preset time interval number aligns with the pointer indicator on the portion 80a of first latch member 80.

Figure 27:
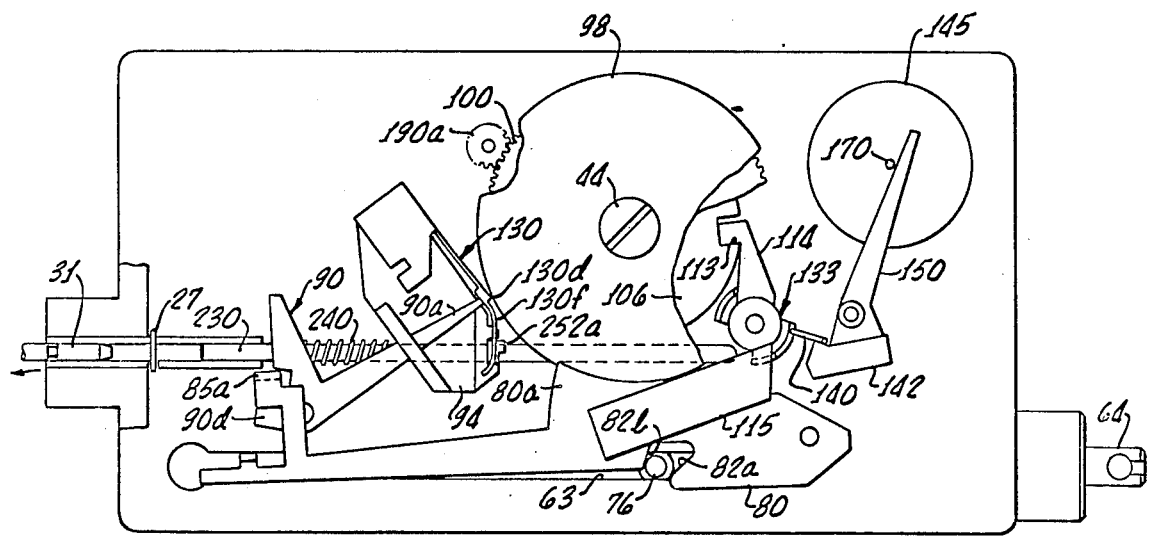
FIG. 27 is a front view of the apparatus showing the major operative components in the respective positions after the apparatus has been separated from the aircraft and/or seat along with the aviator after ejection at a high altitude.

(5) Arming the Apparatus (FIG. 27)

Referring now to FIG. 27, at the time of the parachute wearing aviator separating from the aircraft, or the seat, in the event the aviator is ejected with the seat, the rod 31 will be withdrawn from the apparatus 20, and the interlock rod 230 will be free to move left under force of its spring. The shoulder 250 will return within its recess, and lock tab 252 will drop out of engagement with the cam follower arm 130. The end of interlock arm 230 will be displaced from the sector edge of the pivot block 133 thereby enabling its reverse pivoting after certain conditions have occurred. In FIG. 27, it is still assumed that the apparatus is above the preestablished altitude, as a consequence of which the stop pin 170 is still abutting against the edge of trigger 150.

Figure 28:
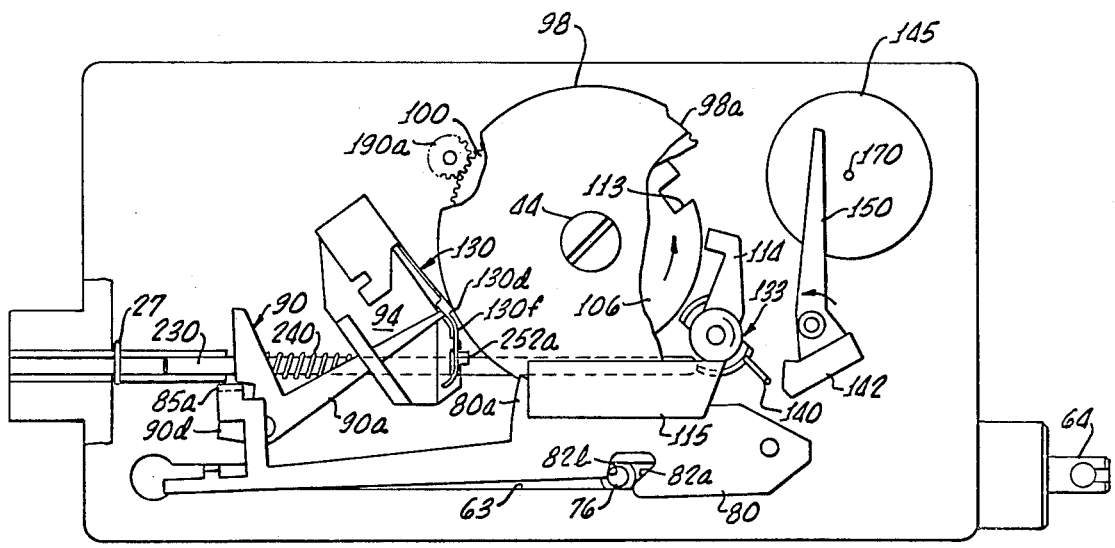
FIG. 28 is a front view of the apparatus showing the major operative components in the respective positions after the apparatus has descended below a pre-established altitude, and the timing mechanism has commenced its timing interval.

(6) Aneroid Mechanism Release (FIG. 28)

In FIG. 28, it is assumed that the aviator has descended to a safe altitude as preestablished by the aviator upon entering the aircraft. At this point, the bellows has contracted with the stop pin 170 falling below the plane of the trigger 150, at which point the force of the lockout pin 140 urges the trigger 150 momentarily counterclockwise as indicated by the arrow thereon. The catch pivot block 133 is thus free to pivot clockwise as indicated by the arrow adjacent thereto, and simultaneously, the catch arm 114 pivots clockwise out of engagement with the catch notch 113 of the gear plate member 106. This action initiates the unwinding of the timing mechanism 56, with the gear plate member 106, concurrently with the timing disc 98, rotating counterclockwise as indicated by the arrow thereon. During this movement the only restraint against the bias of the cam follower arm 130 is the periphery of the timing disc 98.

Figure 29:
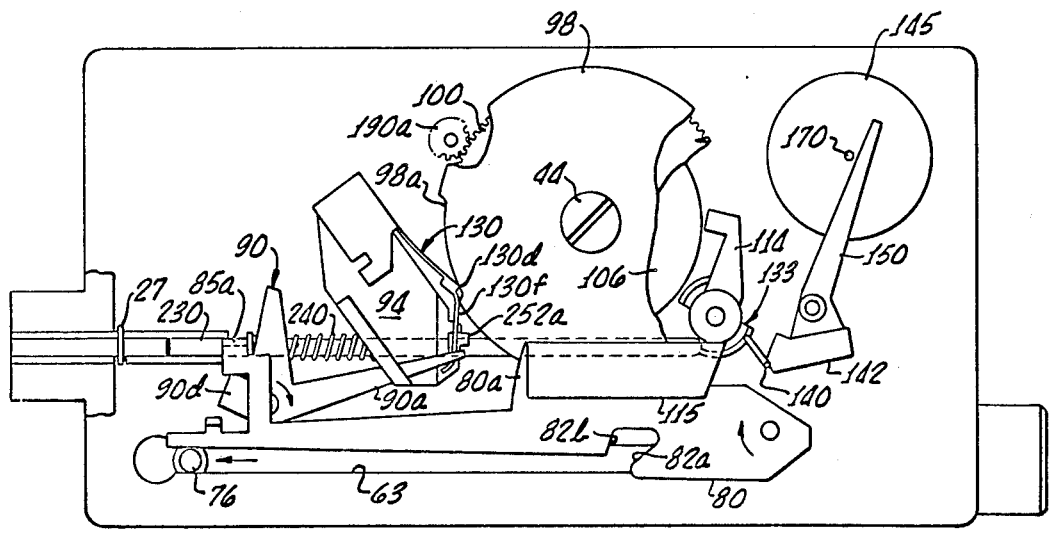
FIG. 29 is a front view of the apparatus showing the major operative components in the respective positions after lapse of the predetermined time interval and release of the ripcord release mechanism.

(7) Ripcord Release (FIG. 29)

Referring now to FIG. 29, as the timing disc 98 continues its counterclockwise rotation, after lapse of the preset time period, the leading edge of the cam portion 98a passes the sharp point of the cam follower arm 130 thereby enabling pivoting of the cam follower arm 130 counterclockwise a distance equal to the radial difference between the cam portion 98a and the balance of the timing disc 98, this small distance being sufficient to enable clockwise pivoting of the second latch 90, as indicated by the arrow thereon, and clockwise pivoting of the first latch 80, as indicated by the arrow thereon. As the latch 80 pivots, the force of the spring on the piston 64 urges the piston post to the left, a distance sufficient for release of the ripcord.

OVERVIEW

In accordance with the present invention, the timing mechanism 56 and escapement mechanism 68 provide accurate repeatable time intervals consistent with the needs of high speed high altitude aircraft. By use of the coaction of the cam follower arm with the cam portion 98a on the circumference of the timing disc 98 as the release initiating event, the number of components from this point to the release latch 80 has been reduced. Unnecessary linkages and gears have been avoided.

In addition, the various components are configured and arranged for minimum deflection or alteration under shock or sudden gravitational forces in any direction in the range of twenty to thirty "G's". The housing 22 and cover 24 are formed of a machined metal, such as an aluminum or light alloy. The first latch 80 is formed of a generally rigid sheet metal operating in sliding relation against a planar surface of a machined recess with an arm 84 having the tip 84a thereof bent toward the interior of the cover 24 for proximate relation thereto to prevent sidewise movement during use. The other arm 85 of latch 80 is bent toward the rear wall of the housing 22 to provide a rigid edge for engagement with a thinner bendable metallic second latch 90.

Although there is a tremendous force exerted by the piston post 76 on the first latch 80, due to the distance between the point of application of this force and the bent end 85a of the latch arm 85, the amount of force applied to the much thinner latch 90 is substantially reduced. With a smaller mass in the latch 90 gravitational effect is minimized. Furthermore, with the arm 90a of the latch 90 engaged within a slit 92 of the block portion 93 of the interlock block 94, the arm 90a slides on a surface of block 94 restrained in deflection by the slit.

The cam follower arm 130, the trigger 150 and the catch arm 114 are likewise formed of thinner metal similar to that for latch 90 with appropriate means being provided for minimizing impact by gravitational forces. With the symmetrical mass balance escapement, gravitational forces are neutralized. The use of four aneroid capsules 145a–145d to form the bellows 145 with a counterbalanced bellows pivot beam, along with the cushions 188 serve to provide a margin of safety in the event of leakage while minimizing the effect of sudden high gravitational forces. Aneroid capsule tolerances may be adjusted by means of the cantilever spring 66 adjustment.

The mechanism heretofore described is compact, efficient, and effective to obtain small increments of timing down to one quarter of a second, repeatable within ten milliseconds. With the ten degree positioning provided of the timing disc 98 relative to the gear plate member 106, with each increment equating to one-quarter second, plus the slidability of the cam follower arm 130 relative to the periphery of disc 98, plus the pivotable adjustment of the mass balance 204 relative to the star wheel 202, extreme accuracy is obtainable, consistent with the needs of supersonic high altitude aircraft.

Additionally, altitude release settings maybe had with relative precision with the cam 180 settings described. Futhermore, prior to entry of the aircraft, the aviator may visually check the ambient altitude indication on the edge indicator 50 viewable through window 49 to determine if it correlates to known altitude, in which event aneroid capsule leakage is not a problem. If there is a significant variance with known altitude, capsule leakage is indicated.

Safety and ease of operation have been fully considered for the user. The apparatus 20 is externally adjustable to desired altitude and timing within one-quarter second intervals. If the rip cord release mechanism is not fully set, the portion 80a of latch 80 covers the numbers on the timing disc 98. If the timing mechanism 56 has not been wound, the flag 115 covers the numbers.

While there has been shown and described a preferred embodiment, it is to be understood that various other adaptations and modifications may be made within the spirit and scope of the invention.

I claim:

1. In a parachute release apparatus for automatically actuating the ripcord of the parachute of an aviator upon separation from one of the aircraft and the seat, the combination comprising:

spring powered release means adapted for coupling to the ripcord means of the parachute and operable between a first position and a second position;

latch means coacting with said release means for retaining said release means in a first position against the force of the spring of said release means;

a spring powered timing mechanism;

means on said timing mechanism for preselecting a predetermined time interval;

means for winding the spring of said timing mechanism;

catch means interoperatively coupled to said timing mechanism and operable between a catch and a release position, said catch means being operable to said catch position upon winding said timing mechanism to store power in the spring thereof; and other means interoperatively coupled to said catch means, said latch means and one of said aircraft and said seat for enabling actuation of said catch means to the release position and for enabling actuation of said release means to said second position after lapse of said predetermined time period after release of said catch means, whereby actuation of said release means actuates the ripcord to open the parachute.

2. The combination according to claim 1 wherein said other means includes ambient atmospheric sensing means.

3. The combination according to claim 1 wherein said other means includes interlock means manually actuable to a lock position and operable to a release position, said interlock means being in interoperative relation with said catch means for enabling operation thereof to said release position only after separation of the aviator from one of said aircraft and said seat.

4. The combinatin according to claim 3 wherein said other means includes cam means operable in response to movement of said timing means, cam follower means coacting with said interlock means and being adapted for engagement with said cam means, said cam follower means being disabled with said interlock means in said lock position and being enabled with said interlock means in said release position.

5. The combination according to claim 4 wherein said other means includes ambient atmospheric sensing means and means operatively interconnecting said atmospheric sensing means and said catch means, adjustment means for preestablishing an atmospheric pressure below which said operative interconnecting means are operable for enabling operation of said catch means to said release position only below said preestablished altitude.

6. In a parachute release apparatus for automatically deploying the parachute of an aviator upon separation from one of the aircraft and the seat, the combination comprising:

spring powered release means adapted for coupling to the ripcord means of the parachute and operable between a first position and a second position;

first latch means coacting with said release means for retaining said release means in a first position against the force of the spring means;

a spring powered timing mechanism;

ambient atmospheric sensing means;

trigger means operatively interconnected to said atmospheric sensing means;

adjustment means for preestablishing an atmospheric pressure below which said trigger means are operable;

means for winding the spring of said timing mechanism;

interlock means manually actuable to a lock position and operable to a release position;

means coupled to said interlock means for actuation thereof to the release position in response to separation of the parachute wearing aviator from one of the seat and the aircraft;

catch means operable from a normal position to a catch position in response to said interlock means being in said lock position for enabling winding of said timing mechanism to store power in the spring means thereof, said catch means being operatively interconnected to said trigger means to prevent operation of said timing means above said preestablished altitude;

means on said timing mechanism for preselecting a predetermined time interval;

cam means operable in response to movement of said timing means;

cam follower means coacting with said interlock means and being adapted for engagement with said cam means, said cam follower means being disabled with said interlock means in said lock position and being enabled with said interlock means in said release position; and second latch means coacting with said first latch means and said cam follower means for enabling actuation of said release means to said second position with said interlock means in said release position after lapse of said predetermined time period after operation of said catch means, whereby actuation of said release means opens the parachute.

7. The combination according to claim 6 wherein said apparatus further includes escapement means coacting with said timing mechanism.

8. The combination according to claim 6 wherein said cam means is a cam drive by said timing mechanism.

9. The combination according to claim 8 wherein said timing mechanism includes a timing gear with said cam disc rotatable therewith and said means for preselecting a predetermined time interval includes means for angularly displacing said cam disc relative to said timing gear.

10. The combination according to claim 9 wherein said apparatus includes a housing with a window, and said cam disc includes indicia thereon viewable through said window, said indicia indicating selectable predetermined time intervals.

11. The combination according to claim 10 wherein said apparatus further includes flag means interoperatively coupled to said catch means for covering said indicia when said catch means are in said normal position.

12. The combination according to claim 6 wherein said apparatus further includes a housing with means for providing an indication of said preestablished altitude and means for providing an indication of said predetermined time period.

13. The combination according to claim 12 wherein said means on said timing mechanism for preselecting a predetermined time interval are accessible from the exterior of said housing.

14. The combination according to claim 13 wherein said adjustment means for preestablishing an atmospheric pressure are accessible from the exterior of said housing.

15. The combination according to claim 14 wherein said ambient atmospheric pressure sensing means includes an aneroid capsule assembly having a stop pin axially movable in response to changes in atmospheric pressure.

16. The combination according to claim 15 wherein said trigger means operatively interact with said stop pin.

17. The combination according to claim 16 wherein said adjustment means includes a cam means interoperatively coupled to said trigger means for adjusting the position of said trigger means relative to said stop pin.

18. In a parachute release apparatus for automatically deploying the parachute of an aviator upon separation from one of the aircraft and the seat, the combination comprising:

a housing;

spring powered release means within said housing and adapted for coupling to the ripcord means of the parachute and operable between a first position and a second position;

latch means coacting with said release means for retaining said release means in a first position against the force of the spring means;

a spring powered timing mechanism within said housing;

means accessible from the exterior of said housing for enabling winding of the spring of said timing mechanism and for enabling selection of a predetermined time interval;

viewing means on said housing for enabling viewing of the time interval so selected;

catch means within said housing interoperatively coupled to said timing mechanism and being operable between a lock position and a release position, said catch means being operable to a lock position in response to winding of said timing mechanism for enabling the storing of power in the spring means thereof;

interlock means within said housing interoperatively coupled to said catch means and said latch means and being manually actuable to a lock position and operable to a release position;

said release means including means for at least partially blocking said viewing means with said release means in said second position;

means coupled to said catch means for at least partially blocking said viewing means with said catch means in said release position; and means coupled to said interlock means for actuation thereof to the release position in response to separation of the parachute wearing aviator from one of the seat and the aircraft for enabling actuation of said catch means to the release position and for enabling actuation of said release means to said second position after lapse of said predetermined time period after release of said catch means, whereby actuation of said release means actuates the ripcord to open the parachute.

19. The combination according to claim 18 wherein said apparatus further includes ambient atmospheric sensing means within said housing, trigger means operatively interconnected to said atmospheric sensing means, adjustment means accessible from the exterior of said housing for preestablishing an atmospheric pressure below which said trigger means are operable, said trigger means being coupled to said catch means for preventing operation of said catch means to said release position until said preestablished altitude has been reached.

20. The combination according to claim 18 wherein said timing mechanism includes a cam disc operable in response to movement of said timing means and cam follower means coacting with said interlock means and being adapted for engagement with said cam disc, said cam follower means being disabled with said interlock means in said lock position and being enabled with said interlock means in said release position.

21. The combination according to claim 20 wherein ssaid cam disc includes indicia thereon indicative of the selective time intervals for viewing through said viewing means.

22. The combination according to claim 19 wherein said ambient atmospheric pressure sensing means includes an aneroid capsule assembly having a stop pin axially movable in response to changes in atmospheric pressure.

23. The combination according to claim 22 wherein said trigger means operatively interact with said stop pin.

24. The combination according to claim 23 wherein said adjustment means includes a cam means interoperatively coupled to said trigger means for adjusting the position of said trigger means relative to said stop pin.

25. The combination according to claim 20 wherein said timing mechanism includes a timing gear with said cam disc rotatable therewith and said means for preselecting a predetermined time interval includes means for angularly displacing said cam disc relative to said timing gear.

26. The combination according to claim 25 wherein the coaction between said cam disc and said timing gear includes detent means for enabling angular relative displacement through increments of ten degrees.

27. The combination according to claim 26 wherein said timing mechanism further includes gear means coupled to said timing gear and escapement means coupled to said gear means.

28. In a parachute release apparatus for automatically deploying the parachute of an aviator upon separation from one of the aircraft and the seat, the combination comprising:
 a housing;
 release means within said housing adapted for coupling to the ripcord means of the parachute for actuation thereof in response to actuation of said release means;
 a spring-powered timing mechanism within said housing including a timing gear means;
 means for winding the spring of said timing mechanism;
 catch means operable upon winding said timing mechanism to store power in the spring thereof;
 a timing disc having a cam portion on the periphery thereof;
 means for coupling said timing disc to said timing gear means for enabling angular displacement of said timing disc relative to said timing gear means with said catch means engaged for preselecting a predetermined time interval and for enabling rotation of said timing disc with said timing gear means;
 cam follower means for coaction with the periphery of said timing disc;
 other means operable in response to separation of the parachute wearing avaiator from one of the seat and the aircraft for enabling release of said catch means and operation of said timing mechanism for said predetermined time interval; and
 latch means coacting with said cam follower means and said release means for retaining said release means in a first position and operable upon contact of said cam follower means with said cam portion for actuation of said release means to a second position for actuation of the ripcord means to open the parachute.

29. The combination according to claim 28 wherein said coupling means includes detent means for enabling relative angular displacement through increments of ten degrees.

30. The combination according to claim 28 wherein said other means includes interlock means manually actuable to a lock position and operable to a release position after separation of the aviator from one of said aircraft and said seat, said interlock means being in interoperative relation with said timing mechanism and said cam follower means for enabling operation thereof only with said interlock means in said release position.

31. In a parachute release apparatus for automatically deploying the parachute of an aviator upon separation from one of the aircraft and the sear, the apparatus having a housing with spring-operated release means within the housing adapted for coupling to the ripcord means of the parachute for actuation thereof in response to actuation of said release means, the improvement comprising:
 a spring-powered timing mechanism within said housing including a timing gear member driven thereby;
 means for winding the spring of said timing mechanism;
 catch means operable upon winding said timing mechanism to store power in the spring thereof;
 a timing disc having a cam portion on the periphery thereof;
 means for coupling said timing disc to said timing gear member for enabling angular displacement of said timing disc relative to said timing gear means with said catch means engaged for preselecting a predetermined time interval and for enabling rotation of said timing disc with said timing gear means;
 cam follower means adapted for coaction with the periphery of said timing disc;
 other means operable in response to separation of the parachute wearing aviator from one of the seat and the aircraft for enabling release of said catch means and operation of said timing mechanism for said predetermined time interval; and
 latch means coacting with said cam follower means and said release means for retaining said release means in a first position and operable upon contact of said cam follower means with said cam portion for actuation of said release means to a second position for actuation of the ripcord means to open the parachute.

32. The combination according to claim 31 wherein said other means includes ambient atmospheric sensing means and means operatively interconnecting said atmospheric sensing means and said timing mechanism, adjustment means for preestablishing an atmospheric pressure below which said operative interconnecting means are operable for enabling operation of said timing mechanism only below said preestablished altitude.

33. A mechanical parachute release mechanism, which comprises:
 (a) spring means to release a parachute,
 (b) means to compress said spring means (a),
 (c) latch means to hold said spring means in compressed condition unitl it is desired that the parachute be released, (d) combination aneroid means and timer means to effect parachute-releasing operation of said latch means and spring means after a precisely-determined time period commencing when said apparatus drops to a predetermined altitude determined by said aneroid means, said timer means including rotatable timer element, second spring means to drive said timer element in a predetermined direction, and means to hold said timer element in a wound position despite the force of said second spring means, said last-named means being operably associated with said aneroid means for operation thereby to release said timer element at said predetermined altitude, (e) means movably associated with said rotatable timer element to visually indicate the time period that will elapse, following release of said rotatable timer element, before said latch means (c) will release said spring means (a), (f) first means to block said visual-indicator means (e) from view at all times except when said rotatable timer element has been wound to its wound position, and (g) second means to block said visual-indicator means (e) from view at all times except when said spring means (a) is in compressed condition, whereby the operator may not see said visual indicator means until said rotatable time element is in its wound position, and until said spring means (a) is compressed, and whereby said visual-indicator means (e) may then be moved to a desired time setting.

34. A parachute-release apparatus having a high degree of accuracy and sensitivity at near zero-time settings, to thus enhance the chances of preventing loss of lives after a take-off ejection of pilots from the plane, said apparatus comprising:

(a) means to release a parachute, and (b) mechanical timer means to initiate parachute-releasing operation of said means (a) a precisely-predetermined period of time after a predetermined event, said timer means comprising a rotatable timer element having a timer disc rotatably mounted thereon, said timer disc having cam means thereon, said timer means further comprising means to permit adjustment of the position of said timer disc relative to said rotatable timer element, and then to maintain said timer disc in a desired adjusted position on said rotatable timer element, said timer means further comprising spring means to effect conjoint rotation of said rotatable timer disc and timer element, said timer means further comprising cam follower means operatively associated with said cam means on said timer disc, and adapted when said cam means is in a predetermined position to initiate operation of said parachute-release means (a), said timer means further comprising means to generate a predetermined drag on said rotatable timer element and timer disc, characterized in that:

(a) said timer means is so constructed that the forces of said timer disc and cam follower means relative to each other are substantially constant when said timer disc is near its zero position, and (b) said timer disc travels a substantial distance during the final second before zero position.

35. The invention as claimed in claim 34, in which said means to generate a predetermined drag on said rotatable timer element and timer disc is a balanced escapement mechanism, and in which means are provided to adjust accurately to speed of operation of said escapement mechanism.

36. A parachute-release apparatus, which comprises:

(a) parachute release means, and (b) timer means to initiate operation of said parachute release means at a desired adjustable time interval after a predetermined event, said timer means comprising a timer wheel and further comprising spring means to rotate said wheel in a predetermined direction, said timer means further comprising a timer disc rotatably mounted coaxially on said timer wheel, said timer disc having time-indicating indicia thereon, said timer means further comprising detent means to cause said timer disc to be at, and only at, predetermined desired rotated positions relative to said timer wheel, and when at such rotated positions to rotate with said wheel, and said timer means further comprising means responsive to the rotated position of said timer disc to effect said initiation of operation of said parachute release means.

37. The invention as claimed in claim 36, in which said detent means comprises a large number of spring-pressed balls mounted in said timer wheel and urged into openings in said time disc, the diameter of said openings being smaller than that of said balls.

38. A parachute release apparatus, which comprises:

(a) a housing;

(b) a helical compression power spring mounted in said housing and connected to pull a rip cord and thus release a parachute when said spring expands, (c) an elongate main latch pivotally mounted in said housing, said main latch being adapted to hold said spring in compressed condition, said main latch being adapted to release said spring when said main latch pivots in a predetermined direction, said main latch being adapted to pivot in a direction opposite to said predetermined direction upon substantially full compression of said spring, (d) an elongate second latch pivotally mounted in said housing, said second latch being adapted when in a cocked position to prevent said main latch from pivoting in said predetermined direction and releasing said spring, said second latch being adapted to pivot to said cocked position in response to pivoting of said main latch in said direction opposite to said predetermined direction as said spring substantially fully compresses, (e) releasable means associated with the distal end portion of said second latch to hold said second latch in said cocked position, (f) a pivot element rotatably mounted in said housing, (g) spring means to bias said pivot element for rotation in a predetermined direction, (h) aneroid means mounted in said housing, (i) means to associate said aneroid means with said pivot element (f) to hold said pivot element in a predetermined cocked position, against the bias of said spring means (g), when said parachute release apparatus is above a predetermined altitude, (j) manually-operable means mounted on said housing and adapted to be operated by the parachutist when on the ground to pivot said pivot element (f) to said cocked position thereof, said manually-operable means (j) being operable by the parachutist when in the air above said predetermined altitude to release said pivot element (f) for pivoting by said spring means (g) when said parachute release apparatus drops to said predetermined altitude so that said aneroid means (h) and said associating means (i) release said pivot element and thus permit said pivot element to be pivoted by said spring means (g), and (k) means responsive to said pivoting of said pivot element to operate said releasable holding means (e) to a release position releasing said distal end portion of said second latch and thereby permitting said main latch to pivot in said predetermined direction to thus release said power spring for opening of the parachute.

39. The invention as claimed in claim 38, in which said releasable holding means (e) is a resilient element that, when in its free condition, is in said release position recited in clause (k).

40. The invention as claimed in claim 38, in which said means (k) responsive to said pivoting of said pivot element includes a time-delay mechanism to provide a predetermined time delay before operation of said releasable holding means (e) to said release position, said time delay starting upon dropping of said parachute release apparatus to said predetermined altitude.

* * * * *